US012118849B2

(12) United States Patent
Nguyen et al.

(10) Patent No.: US 12,118,849 B2
(45) Date of Patent: Oct. 15, 2024

(54) ADAPTIVE MOBILE DEVICE GAMING SYSTEM

(71) Applicant: Aristocrat Technologies, Inc. (ATI), Las Vegas, NV (US)

(72) Inventors: Binh T. Nguyen, Reno, NV (US); C. Douglass Thomas, Saratoga, CA (US)

(73) Assignee: Aristocrat Technologies, Inc. (ATI), Las Vegas, NV (US)

( * ) Notice: Subject to any disclaimer, the term of this patent is extended or adjusted under 35 U.S.C. 154(b) by 0 days.

(21) Appl. No.: 18/328,259

(22) Filed: Jun. 2, 2023

(65) Prior Publication Data

US 2023/0306813 A1 Sep. 28, 2023

Related U.S. Application Data

(63) Continuation of application No. 17/306,946, filed on May 4, 2021, now Pat. No. 11,670,134, which is a (Continued)

(51) Int. Cl.
*G07F 17/32* (2006.01)

(52) U.S. Cl.
CPC ...... *G07F 17/3237* (2013.01); *G07F 17/3211* (2013.01); *G07F 17/3218* (2013.01); (Continued)

(58) Field of Classification Search
CPC ............. G07F 17/3237; G07F 17/3211; G07F 17/3218; G07F 17/3225; G07F 17/3241; G07F 17/3288
See application file for complete search history.

(56) References Cited

U.S. PATENT DOCUMENTS 2,033,638 A 3/1936 Koppl
2,062,923 A 12/1936 Pal
(Continued)

FOREIGN PATENT DOCUMENTS

GB 2033638 A 5/1980
GB 2062923 A 5/1981
(Continued)

OTHER PUBLICATIONS

Benston, Liz, "Harrahs Launches iPhone App; Caesars Bypasses Check-in," Las Vegas Sun, Las Vegas, NV. Jan. 8, 2010.
(Continued)

*Primary Examiner* — Kevin Y Kim
(74) *Attorney, Agent, or Firm* — McAndrews, Held & Malloy, Ltd.

(57) ABSTRACT

Embodiments disclosed herein concern mobile gaming environments. Portable electronic devices can be supported by the mobile gaming environments. The locations of the portable electronic device can influence how the portable electronic devices operate or what services or features are available to the portable electronic device or their users. According to one embodiment, a mobile gaming system can concern gaming/betting opportunities that can be secured using a portable electronic device even when an individual is located in a location where betting or games of chance are not permitted. According to another embodiment, a mobile gaming system can concern an application program operating on a portable electronic device that supports multiple modes of operation depending upon whether the portable electronic device is in a location where betting or games of chance are permitted.

18 Claims, 9 Drawing Sheets

Related U.S. Application Data continuation of application No. 16/590,347, filed on Oct. 1, 2019, now Pat. No. 11,004,304, which is a continuation of application No. 16/143,428, filed on Sep. 26, 2018, now Pat. No. 10,445,978, which is a continuation of application No. 15/427,291, filed on Feb. 8, 2017, now Pat. No. 10,115,263, which is a continuation of application No. 14/211,536, filed on Mar. 14, 2014, now Pat. No. 9,600,976.

(60) Provisional application No. 61/873,300, filed on Sep. 3, 2013, provisional application No. 61/799,862, filed on Mar. 15, 2013.

(52) U.S. Cl.
CPC ...... *G07F 17/3225* (2013.01); *G07F 17/3241* (2013.01); *G07F 17/3288* (2013.01)

(56) References Cited

U.S. PATENT DOCUMENTS

| | | | |
|---|---|---|---|
| 4,741,539 | A | 5/1988 | Sutton |
| 4,948,138 | A | 8/1990 | Pease |
| 4,969,183 | A | 11/1990 | Reese |
| 5,067,712 | A | 11/1991 | Georgilas |
| 5,275,400 | A | 1/1994 | Weingardt |
| 5,429,361 | A | 7/1995 | Raven |
| 5,489,103 | A | 2/1996 | Okamoto |
| 5,618,232 | A | 4/1997 | Martin |
| 5,630,757 | A | 5/1997 | Gagin |
| 5,655,961 | A | 8/1997 | Acres |
| 5,704,835 | A | 1/1998 | Dietz, II |
| 5,727,786 | A | 3/1998 | Weingardt |
| 5,833,537 | A | 11/1998 | Barrie |
| 5,842,921 | A | 12/1998 | Mindes |
| 5,919,091 | A | 7/1999 | Bell |
| 5,947,820 | A | 9/1999 | Morro |
| 5,997,401 | A | 12/1999 | Crawford |
| 6,001,016 | A | 12/1999 | Walker |
| 6,039,648 | A | 3/2000 | Guinn |
| 6,059,289 | A | 5/2000 | Vancura |
| 6,089,977 | A | 7/2000 | Bennett |
| 6,095,920 | A | 8/2000 | Sadahiro |
| 6,110,041 | A | 8/2000 | Walker |
| 6,142,872 | A | 11/2000 | Walker |
| 6,146,271 | A | 11/2000 | Kadlic |
| 6,146,273 | A | 11/2000 | Olsen |
| 6,165,071 | A | 12/2000 | Weiss |
| 6,231,445 | B1 | 5/2001 | Acres |
| 6,244,958 | B1 | 6/2001 | Acres |
| 6,270,412 | B1 | 8/2001 | Crawford |
| 6,290,600 | B1 | 9/2001 | Glasson |
| 6,293,866 | B1 | 9/2001 | Walker |
| 6,353,390 | B1 | 3/2002 | Beri |
| 6,364,768 | B1 | 4/2002 | Acres |
| 6,404,884 | B1 | 6/2002 | Marwell |
| 6,416,406 | B1 | 7/2002 | Duhamel |
| 6,416,409 | B1 | 7/2002 | Jordan |
| 6,443,452 | B1 | 9/2002 | Brune |
| 6,491,584 | B2 | 12/2002 | Graham |
| 6,500,067 | B1 | 12/2002 | Luciano |
| 6,505,095 | B1 | 1/2003 | Kolls |
| 6,508,710 | B1 | 1/2003 | Paravia |
| 6,561,900 | B1 | 5/2003 | Baerlocher |
| 6,592,457 | B1 | 7/2003 | Frohm |
| 6,612,574 | B1 | 9/2003 | Cole |
| 6,620,046 | B2 | 9/2003 | Rowe |
| 6,641,477 | B1 | 11/2003 | Dietz, II |
| 6,645,078 | B1 | 11/2003 | Mattice |
| 6,675,152 | B1 | 1/2004 | Prasad |
| 6,699,128 | B1 | 3/2004 | Beadell |
| 6,719,630 | B1 | 4/2004 | Seelig |
| 6,749,510 | B2 | 6/2004 | Giobbi |
| 6,758,757 | B2 | 7/2004 | Luciano, Jr. |
| 6,773,345 | B2 | 8/2004 | Walker |
| 6,778,820 | B2 | 8/2004 | Tendler |
| 6,780,111 | B2 | 8/2004 | Cannon |
| 6,799,032 | B2 | 9/2004 | McDonnell |
| 6,800,027 | B2 | 10/2004 | Giobbi |
| 6,804,763 | B1 | 10/2004 | Stockdale |
| 6,811,486 | B1 | 11/2004 | Luciano, Jr. |
| 6,843,725 | B2 | 1/2005 | Nelson |
| 6,846,238 | B2 | 1/2005 | Wells |
| 6,848,995 | B1 | 2/2005 | Walker |
| 6,852,029 | B2 | 2/2005 | Baltz |
| 6,869,361 | B2 | 3/2005 | Sharpless |
| 6,875,106 | B2 | 4/2005 | Weiss |
| 6,884,170 | B2 | 4/2005 | Rowe |
| 6,884,172 | B1 | 4/2005 | Lloyd |
| 6,902,484 | B2 | 6/2005 | Idaka |
| 6,908,390 | B2 | 6/2005 | Nguyen |
| 6,913,532 | B2 | 7/2005 | Baerlocher |
| 6,923,721 | B2 | 8/2005 | Luciano |
| 6,935,958 | B2 | 8/2005 | Nelson |
| 6,949,022 | B1 | 9/2005 | Showers |
| 6,955,600 | B2 | 10/2005 | Glavich |
| 6,971,956 | B2 | 12/2005 | Rowe |
| 6,984,174 | B2 | 1/2006 | Cannon |
| 6,997,803 | B2 | 2/2006 | Lemay |
| 7,018,292 | B2 | 3/2006 | Tracy |
| 7,032,115 | B2 | 4/2006 | Kashani |
| 7,033,276 | B2 | 4/2006 | Walker |
| 7,035,626 | B1 | 4/2006 | Luciano, Jr. |
| 7,037,195 | B2 | 5/2006 | Schneider |
| 7,048,628 | B2 | 5/2006 | Schneider |
| 7,048,630 | B2 | 5/2006 | Berg |
| 7,063,617 | B2 | 6/2006 | Brosnan |
| 7,076,329 | B1 | 7/2006 | Kolls |
| 7,089,264 | B1 | 8/2006 | Guido |
| 7,094,148 | B2 | 8/2006 | Baerlocher |
| 7,105,736 | B2 | 9/2006 | Laakso |
| 7,111,141 | B2 | 9/2006 | Nelson |
| 7,144,321 | B2 | 12/2006 | Mayeroff |
| 7,152,783 | B2 | 12/2006 | Charrin |
| 7,169,041 | B2 | 1/2007 | Tessmer |
| 7,169,052 | B2 | 1/2007 | Beaulieu |
| 7,175,523 | B2 | 2/2007 | Gilmore |
| 7,181,228 | B2 | 2/2007 | Boesch |
| 7,182,690 | B2 | 2/2007 | Giobbi |
| 7,198,571 | B2 | 4/2007 | Lemay |
| RE39,644 | E | 5/2007 | Alcorn |
| 7,217,191 | B2 | 5/2007 | Cordell |
| 7,243,104 | B2 | 7/2007 | Bill |
| 7,247,098 | B1 | 7/2007 | Bradford |
| 7,259,718 | B2 | 8/2007 | Patterson |
| 7,275,989 | B2 | 10/2007 | Moody |
| 7,285,047 | B2 | 10/2007 | Gelb |
| 7,311,608 | B1 | 12/2007 | Danieli |
| 7,314,408 | B2 | 1/2008 | Cannon |
| 7,316,615 | B2 | 1/2008 | Soltys |
| 7,316,619 | B2 | 1/2008 | Nelson |
| 7,318,775 | B2 | 1/2008 | Brosnan |
| 7,326,116 | B2 | 2/2008 | O'Donovan |
| 7,330,108 | B2 | 2/2008 | Thomas |
| 7,346,358 | B2 | 3/2008 | Wood |
| 7,355,112 | B2 | 4/2008 | Laakso |
| 7,384,338 | B2 | 6/2008 | Rothschild |
| 7,387,571 | B2 | 6/2008 | Walker |
| 7,393,278 | B2 | 7/2008 | Gerson |
| 7,396,990 | B2 | 7/2008 | Lu |
| 7,415,426 | B2 | 8/2008 | Williams |
| 7,425,177 | B2 | 9/2008 | Rodgers |
| 7,427,234 | B2 | 9/2008 | Soltys |
| 7,427,236 | B2 | 9/2008 | Kaminkow |
| 7,427,708 | B2 | 9/2008 | Ohmura |
| 7,431,650 | B2 | 10/2008 | Kessman |
| 7,448,949 | B2 | 11/2008 | Kaminkow |
| 7,500,913 | B2 | 3/2009 | Baerlocher |
| 7,510,474 | B2 | 3/2009 | Carter, Sr. |
| 7,513,828 | B2 | 4/2009 | Nguyen |
| 7,519,838 | B1 | 4/2009 | Suurballe |
| 7,559,838 | B2 | 7/2009 | Walker |
| 7,563,167 | B2 | 7/2009 | Walker |

(56) References Cited

U.S. PATENT DOCUMENTS 7,572,183 B2 8/2009 Olivas
7,585,222 B2 9/2009 Muir
7,602,298 B2 10/2009 Thomas
7,607,174 B1 10/2009 Kashchenko
7,611,409 B2 11/2009 Muir
7,637,810 B2 12/2009 Amaitis
7,644,861 B2 1/2010 Alderucci
7,653,757 B1 1/2010 Fernald
7,693,306 B2 4/2010 Huber
7,699,703 B2 4/2010 Muir
7,722,453 B2 5/2010 Lark
7,742,996 B1 6/2010 Kwan
7,758,423 B2 7/2010 Foster
7,771,271 B2 8/2010 Walker
7,780,529 B2 8/2010 Rowe
7,780,531 B2 8/2010 Englman
7,785,192 B2 8/2010 Canterbury
7,811,172 B2 10/2010 Asher
7,819,749 B1 10/2010 Fish
7,822,688 B2 10/2010 Labrou
7,828,652 B2 11/2010 Nguyen
7,828,654 B2 11/2010 Carter, Sr.
7,828,661 B1 11/2010 Fish
7,850,528 B2 12/2010 Wells
7,874,919 B2 1/2011 Paulsen
7,877,798 B2 1/2011 Saunders
7,883,413 B2 2/2011 Paulsen
7,892,097 B2 2/2011 Muir
7,909,692 B2 3/2011 Nguyen
7,909,699 B2 3/2011 Parrott
7,918,728 B2 4/2011 Nguyen
7,927,211 B2 4/2011 Rowe
7,927,212 B2 4/2011 Hedrick
7,951,008 B2 5/2011 Wolf
8,057,298 B2 11/2011 Nguyen
8,057,303 B2 11/2011 Rasmussen
8,087,988 B2 1/2012 Nguyen
8,117,608 B1 2/2012 Slettehaugh
8,133,113 B2 3/2012 Nguyen
8,182,326 B2 5/2012 Speer, II
8,210,927 B2 7/2012 Hedrick
8,221,245 B2 7/2012 Walker
8,226,459 B2 7/2012 Barrett
8,226,474 B2 7/2012 Nguyen
8,231,456 B2 7/2012 Zielinski
8,235,803 B2 8/2012 Loose
8,276,010 B2 9/2012 Vavilala
8,282,475 B2 10/2012 Nguyen
8,323,099 B2 12/2012 Durham
8,337,290 B2 12/2012 Nguyen
8,342,946 B2 1/2013 Amaitis
8,393,948 B2 3/2013 Allen
8,403,758 B2 3/2013 Hornik
8,430,745 B2 4/2013 Agarwal
8,461,958 B2 6/2013 Saenz
8,465,368 B2 6/2013 Hardy
8,469,813 B2 6/2013 Joshi
8,529,345 B2 9/2013 Nguyen
8,597,108 B2 12/2013 Nguyen
8,602,875 B2 12/2013 Nguyen
8,613,655 B2 12/2013 Kisenwether
8,613,659 B2 12/2013 Nelson
8,678,901 B1 3/2014 Kelly
8,696,470 B2 4/2014 Nguyen
8,745,417 B2 6/2014 Huang
8,821,255 B1 9/2014 Friedman
8,834,254 B2 9/2014 Buchholz
8,858,323 B2 10/2014 Nguyen
8,864,586 B2 10/2014 Nguyen
8,942,995 B1 1/2015 Kerr
9,039,507 B2 5/2015 Allen
9,165,422 B2 10/2015 Barclay
9,235,952 B2 1/2016 Nguyen
9,292,996 B2 3/2016 Davis
9,325,203 B2 4/2016 Nguyen
9,466,171 B2 10/2016 Hornik
9,483,901 B2 11/2016 Nguyen
9,486,697 B2 11/2016 Nguyen
9,486,704 B2 11/2016 Nguyen
9,530,277 B2 12/2016 Nelson
9,576,425 B2 2/2017 Nguyen
9,626,826 B2 4/2017 Nguyen
9,666,015 B2 5/2017 Acres
9,666,021 B2 5/2017 Nguyen
9,672,686 B2 6/2017 Nguyen
9,741,205 B2 8/2017 Nguyen
9,811,973 B2 11/2017 Nguyen
9,814,970 B2 11/2017 Nguyen
9,842,462 B2 12/2017 Nguyen
9,875,606 B2 1/2018 Nguyen
9,875,609 B2 1/2018 Nguyen
9,981,180 B2 5/2018 Koyanagi
10,068,429 B2 9/2018 Gagner
10,115,270 B2 10/2018 Gagner
10,140,816 B2 11/2018 Nguyen
10,325,447 B2 6/2019 Malek
10,421,010 B2 9/2019 Nguyen
10,438,446 B2 10/2019 Nguyen
10,445,978 B2 10/2019 Nguyen
10,796,679 B1 10/2020 Powell
10,818,133 B2 10/2020 Nguyen
2001/0004607 A1 6/2001 Olsen
2001/0016516 A1 8/2001 Takatsuka
2001/0024971 A1 9/2001 Brossard
2001/0025272 A1 9/2001 Mori
2001/0031659 A1 10/2001 Perrie
2001/0037211 A1 11/2001 McNutt
2001/0047291 A1 11/2001 Garahi
2002/0006822 A1 1/2002 Krintzman
2002/0042295 A1 4/2002 Walker
2002/0043759 A1 4/2002 Vancura
2002/0045474 A1 4/2002 Singer
2002/0107065 A1 8/2002 Rowe
2002/0107799 A1 8/2002 Hoshino
2002/0111210 A1 8/2002 Anthony
2002/0111213 A1 8/2002 Mcentee
2002/0113369 A1 8/2002 Weingardt
2002/0116615 A1 8/2002 Nguyen
2002/0133418 A1 9/2002 Hammond
2002/0137217 A1 9/2002 Rowe
2002/0142825 A1 10/2002 Lark
2002/0145051 A1 10/2002 Charrin
2002/0147047 A1 10/2002 Letovsky
2002/0147049 A1 10/2002 Carter
2002/0151366 A1 10/2002 Walker
2002/0152120 A1 10/2002 Howington
2002/0167536 A1 11/2002 Valdes
2002/0177483 A1 11/2002 Cannon
2002/0183105 A1 12/2002 Cannon
2003/0001338 A1 1/2003 Bennett
2003/0003988 A1* 1/2003 Walker .................. G07F 17/323
463/21
2003/0003996 A1 1/2003 Nguyen
2003/0004871 A1 1/2003 Rowe
2003/0008696 A1 1/2003 Abecassis
2003/0013531 A1 1/2003 Rowe
2003/0027635 A1 2/2003 Walker
2003/0064805 A1 4/2003 Wells
2003/0064807 A1 4/2003 Walker
2003/0078094 A1 4/2003 Gatto
2003/0092480 A1 5/2003 White
2003/0100361 A1 5/2003 Sharpless
2003/0103965 A1 6/2003 Jung
2003/0104860 A1 6/2003 Cannon
2003/0104865 A1 6/2003 Itkis
2003/0148809 A1 8/2003 Nelson
2003/0162588 A1 8/2003 Brosnan
2003/0176218 A1* 9/2003 LeMay ............... G07F 17/3251
463/25
2003/0195024 A1 10/2003 Slattery
2003/0195043 A1 10/2003 Shinners
2003/0199295 A1 10/2003 Vancura
2003/0224852 A1 12/2003 Walker
2003/0224854 A1 12/2003 Joao

(56) References Cited

U.S. PATENT DOCUMENTS

| | | | |
|---|---|---|---|
| 2004/0002386 | A1 | 1/2004 | Wolfe |
| 2004/0005919 | A1 | 1/2004 | Walker |
| 2004/0015619 | A1 | 1/2004 | Brown |
| 2004/0023709 | A1 | 2/2004 | Beaulieu |
| 2004/0023716 | A1 | 2/2004 | Gauselmann |
| 2004/0038736 | A1 | 2/2004 | Bryant |
| 2004/0048650 | A1 | 3/2004 | Mierau |
| 2004/0068460 | A1 | 4/2004 | Feeley |
| 2004/0082384 | A1 | 4/2004 | Walker |
| 2004/0082385 | A1 | 4/2004 | Silva |
| 2004/0094624 | A1 | 5/2004 | Fernandes |
| 2004/0106449 | A1 | 6/2004 | Walker |
| 2004/0127277 | A1 | 7/2004 | Walker |
| 2004/0127290 | A1 | 7/2004 | Walker |
| 2004/0137987 | A1 | 7/2004 | Nguyen |
| 2004/0142744 | A1 | 7/2004 | Atkinson |
| 2004/0147308 | A1 | 7/2004 | Walker |
| 2004/0152508 | A1 | 8/2004 | Lind |
| 2004/0199631 | A1 | 10/2004 | Natsume |
| 2004/0214622 | A1 | 10/2004 | Atkinson |
| 2004/0224753 | A1 | 11/2004 | O'Donovan |
| 2004/0229671 | A1 | 11/2004 | Stronach |
| 2004/0256803 | A1 | 12/2004 | Ko |
| 2004/0259633 | A1 | 12/2004 | Gentles |
| 2005/0003890 | A1 | 1/2005 | Hedrick |
| 2005/0004980 | A1 | 1/2005 | Vadjinia |
| 2005/0026696 | A1 | 2/2005 | Hashimoto |
| 2005/0033651 | A1 | 2/2005 | Kogan |
| 2005/0043996 | A1 | 2/2005 | Silver |
| 2005/0054446 | A1 | 3/2005 | Kammler |
| 2005/0101376 | A1 | 5/2005 | Walker |
| 2005/0101383 | A1 | 5/2005 | Wells |
| 2005/0130728 | A1 | 6/2005 | Nguyen |
| 2005/0130731 | A1 | 6/2005 | Englman |
| 2005/0137014 | A1 | 6/2005 | Vetelainen |
| 2005/0143169 | A1 | 6/2005 | Nguyen |
| 2005/0167921 | A1 | 8/2005 | Finocchio |
| 2005/0170883 | A1 | 8/2005 | Muskin |
| 2005/0181865 | A1 | 8/2005 | Luciano, Jr. |
| 2005/0181870 | A1 | 8/2005 | Nguyen |
| 2005/0181875 | A1 | 8/2005 | Hoehne |
| 2005/0187020 | A1 | 8/2005 | Amaitis |
| 2005/0202865 | A1 | 9/2005 | Kim |
| 2005/0202875 | A1 | 9/2005 | Murphy |
| 2005/0208993 | A1 | 9/2005 | Yoshizawa |
| 2005/0209002 | A1 | 9/2005 | Blythe |
| 2005/0221881 | A1 | 10/2005 | Lannert |
| 2005/0223219 | A1 | 10/2005 | Gatto |
| 2005/0239546 | A1 | 10/2005 | Hedrick |
| 2005/0255919 | A1 | 11/2005 | Nelson |
| 2005/0273635 | A1 | 12/2005 | Wilcox |
| 2005/0277471 | A1 | 12/2005 | Russell |
| 2005/0282637 | A1 | 12/2005 | Gatto |
| 2006/0009283 | A1 | 1/2006 | Englman |
| 2006/0035707 | A1 | 2/2006 | Nguyen |
| 2006/0036874 | A1 | 2/2006 | Cockerille |
| 2006/0046822 | A1 | 3/2006 | Kaminkow |
| 2006/0046830 | A1 | 3/2006 | Webb |
| 2006/0046849 | A1 | 3/2006 | Kovacs |
| 2006/0068893 | A1 | 3/2006 | Jaffe |
| 2006/0068897 | A1 | 3/2006 | Sanford |
| 2006/0073869 | A1 | 4/2006 | Lemay |
| 2006/0073888 | A1 | 4/2006 | Nguyen |
| 2006/0073897 | A1 | 4/2006 | Englman |
| 2006/0079317 | A1 | 4/2006 | Flemming |
| 2006/0121972 | A1 | 6/2006 | Walker |
| 2006/0126529 | A1 | 6/2006 | Hardy |
| 2006/0148551 | A1 | 7/2006 | Walker |
| 2006/0189382 | A1 | 8/2006 | Muir |
| 2006/0217170 | A1 | 9/2006 | Roireau |
| 2006/0217193 | A1 | 9/2006 | Walker |
| 2006/0247028 | A1 | 11/2006 | Brosnan |
| 2006/0247035 | A1 | 11/2006 | Rowe |
| 2006/0252530 | A1 | 11/2006 | Oberberger |
| 2006/0253481 | A1 | 11/2006 | Guido |
| 2006/0256135 | A1 | 11/2006 | Aoyama |
| 2006/0281525 | A1 | 12/2006 | Borissov |
| 2006/0281541 | A1 | 12/2006 | Nguyen |
| 2006/0287106 | A1 | 12/2006 | Jensen |
| 2007/0004510 | A1 | 1/2007 | Underdahl |
| 2007/0026935 | A1 | 2/2007 | Wolf |
| 2007/0026942 | A1 | 2/2007 | Kinsley |
| 2007/0054739 | A1 | 3/2007 | Amaitis |
| 2007/0060254 | A1 | 3/2007 | Muir |
| 2007/0060306 | A1 | 3/2007 | Amaitis |
| 2007/0060319 | A1 | 3/2007 | Block |
| 2007/0060358 | A1 | 3/2007 | Amaitis |
| 2007/0077981 | A1 | 4/2007 | Hungate |
| 2007/0087833 | A1 | 4/2007 | Feeney |
| 2007/0087834 | A1 | 4/2007 | Moser |
| 2007/0093299 | A1 | 4/2007 | Bergeron |
| 2007/0111777 | A1 | 5/2007 | Amaitis |
| 2007/0129123 | A1 | 6/2007 | Eryou |
| 2007/0129148 | A1 | 6/2007 | Van Luchene |
| 2007/0149279 | A1 | 6/2007 | Norden |
| 2007/0149286 | A1 | 6/2007 | Bemmel |
| 2007/0159301 | A1 | 7/2007 | Hirt |
| 2007/0161402 | A1 | 7/2007 | Ng |
| 2007/0184896 | A1 | 8/2007 | Dickerson |
| 2007/0184904 | A1 | 8/2007 | Lee |
| 2007/0191109 | A1 | 8/2007 | Crowder, Jr. |
| 2007/0207852 | A1 | 9/2007 | Nelson |
| 2007/0207854 | A1 | 9/2007 | Wolf |
| 2007/0235521 | A1 | 10/2007 | Mateen |
| 2007/0238505 | A1 | 10/2007 | Okada |
| 2007/0241187 | A1 | 10/2007 | Alderucci |
| 2007/0248036 | A1 | 10/2007 | Nevalainen |
| 2007/0257430 | A1 | 11/2007 | Hardy |
| 2007/0259713 | A1 | 11/2007 | Fiden |
| 2007/0259716 | A1 | 11/2007 | Mattice |
| 2007/0259717 | A1 | 11/2007 | Mattice |
| 2007/0265984 | A1 | 11/2007 | Santhana |
| 2007/0270213 | A1 | 11/2007 | Nguyen |
| 2007/0275777 | A1 | 11/2007 | Walker |
| 2007/0275779 | A1 | 11/2007 | Amaitis |
| 2007/0281782 | A1 | 12/2007 | Amaitis |
| 2007/0281785 | A1 | 12/2007 | Amaitis |
| 2007/0298858 | A1 | 12/2007 | Toneguzzo |
| 2007/0298873 | A1 | 12/2007 | Nguyen |
| 2008/0013906 | A1 | 1/2008 | Matsuo |
| 2008/0015032 | A1 | 1/2008 | Bradford |
| 2008/0020824 | A1 | 1/2008 | Cuddy |
| 2008/0020845 | A1 | 1/2008 | Low |
| 2008/0032787 | A1 | 2/2008 | Low |
| 2008/0070652 | A1 | 3/2008 | Nguyen |
| 2008/0070681 | A1 | 3/2008 | Marks |
| 2008/0076505 | A1 | 3/2008 | Nguyen |
| 2008/0076506 | A1 | 3/2008 | Nguyen |
| 2008/0076527 | A1 | 3/2008 | Low |
| 2008/0076548 | A1 | 3/2008 | Paulsen |
| 2008/0076572 | A1 | 3/2008 | Nguyen |
| 2008/0096650 | A1 | 4/2008 | Baerlocher |
| 2008/0102916 | A1 | 5/2008 | Kovacs |
| 2008/0102935 | A1 | 5/2008 | Finnimore |
| 2008/0102956 | A1 | 5/2008 | Burman |
| 2008/0102957 | A1 | 5/2008 | Burman |
| 2008/0108401 | A1 | 5/2008 | Baerlocher |
| 2008/0113772 | A1 | 5/2008 | Burrill |
| 2008/0119267 | A1 | 5/2008 | Denlay |
| 2008/0126529 | A1 | 5/2008 | Kim |
| 2008/0139274 | A1 | 6/2008 | Baerlocher |
| 2008/0139306 | A1 | 6/2008 | Lutnick |
| 2008/0146321 | A1 | 6/2008 | Parente |
| 2008/0146344 | A1 | 6/2008 | Rowe |
| 2008/0150902 | A1 | 6/2008 | Edpalm |
| 2008/0153583 | A1 | 6/2008 | Huntley |
| 2008/0161110 | A1 | 7/2008 | Campbell |
| 2008/0167106 | A1 | 7/2008 | Lutnick |
| 2008/0167118 | A1 | 7/2008 | Kroeckel |
| 2008/0167130 | A1 | 7/2008 | Kroeckel |
| 2008/0182667 | A1 | 7/2008 | Davis |
| 2008/0200251 | A1 | 8/2008 | Alderucci |
| 2008/0207307 | A1 | 8/2008 | Cunningham, II |
| 2008/0214258 | A1 | 9/2008 | Brosnan |

(56) References Cited

U.S. PATENT DOCUMENTS

| | | | |
|---|---|---|---|
| 2008/0214310 | A1 | 9/2008 | Brunet De Courssou |
| 2008/0215319 | A1 | 9/2008 | Lu |
| 2008/0234047 | A1 | 9/2008 | Nguyen |
| 2008/0238610 | A1 | 10/2008 | Rosenberg |
| 2008/0248849 | A1 | 10/2008 | Lutnick |
| 2008/0248865 | A1 | 10/2008 | Tedesco |
| 2008/0252419 | A1 | 10/2008 | Batchelor |
| 2008/0254878 | A1 | 10/2008 | Saunders |
| 2008/0254881 | A1 | 10/2008 | Lutnick |
| 2008/0254883 | A1 | 10/2008 | Patel |
| 2008/0254891 | A1 | 10/2008 | Saunders |
| 2008/0254892 | A1 | 10/2008 | Saunders |
| 2008/0254897 | A1 | 10/2008 | Saunders |
| 2008/0263173 | A1 | 10/2008 | Weber |
| 2008/0268959 | A1 | 10/2008 | Bryson |
| 2008/0274783 | A1 | 11/2008 | Walker |
| 2008/0300058 | A1 | 12/2008 | Sum |
| 2008/0305864 | A1 | 12/2008 | Kelly |
| 2008/0305865 | A1 | 12/2008 | Kelly |
| 2008/0305866 | A1 | 12/2008 | Kelly |
| 2008/0311994 | A1 | 12/2008 | Amaitis |
| 2008/0318669 | A1 | 12/2008 | Buchholz |
| 2008/0318686 | A1 | 12/2008 | Crowder |
| 2009/0005165 | A1 | 1/2009 | Arezina |
| 2009/0011822 | A1 | 1/2009 | Englman |
| 2009/0017906 | A1 | 1/2009 | Jackson |
| 2009/0021381 | A1 | 1/2009 | Kondo |
| 2009/0029766 | A1 | 1/2009 | Lutnick |
| 2009/0054149 | A1 | 2/2009 | Brosnan |
| 2009/0061990 | A1 | 3/2009 | Schwartz |
| 2009/0069063 | A1 | 3/2009 | Thomas |
| 2009/0077396 | A1 | 3/2009 | Tsai |
| 2009/0088258 | A1 | 4/2009 | Saunders |
| 2009/0098925 | A1 | 4/2009 | Gagner |
| 2009/0104977 | A1 | 4/2009 | Zielinski |
| 2009/0104983 | A1 | 4/2009 | Okada |
| 2009/0118002 | A1 | 5/2009 | Lyons |
| 2009/0118013 | A1 | 5/2009 | Finnimore |
| 2009/0118022 | A1 | 5/2009 | Lyons |
| 2009/0124366 | A1 | 5/2009 | Aoki |
| 2009/0124390 | A1 | 5/2009 | Seelig |
| 2009/0131146 | A1 | 5/2009 | Arezina |
| 2009/0131151 | A1 | 5/2009 | Harris |
| 2009/0131155 | A1 | 5/2009 | Hollibaugh |
| 2009/0132163 | A1 | 5/2009 | Ashley, Jr. |
| 2009/0137255 | A1 | 5/2009 | Ashley, Jr. |
| 2009/0138133 | A1 | 5/2009 | Buchholz |
| 2009/0143141 | A1 | 6/2009 | Wells |
| 2009/0149245 | A1 | 6/2009 | Fabbri |
| 2009/0149261 | A1 | 6/2009 | Chen |
| 2009/0153342 | A1 | 6/2009 | Thorn |
| 2009/0156303 | A1 | 6/2009 | Kiely |
| 2009/0163272 | A1 | 6/2009 | Baker |
| 2009/0176578 | A1 | 7/2009 | Herrmann |
| 2009/0191962 | A1 | 7/2009 | Hardy |
| 2009/0197684 | A1 | 8/2009 | Arezina |
| 2009/0216547 | A1 | 8/2009 | Canora |
| 2009/0219901 | A1 | 9/2009 | Bull |
| 2009/0221342 | A1 | 9/2009 | Katz |
| 2009/0227302 | A1 | 9/2009 | Abe |
| 2009/0239666 | A1 | 9/2009 | Hall |
| 2009/0264190 | A1 | 10/2009 | Davis |
| 2009/0270166 | A1 | 10/2009 | Thukral |
| 2009/0270170 | A1 | 10/2009 | Patton |
| 2009/0271287 | A1 | 10/2009 | Halpern |
| 2009/0275402 | A1 | 11/2009 | Backover |
| 2009/0275410 | A1 | 11/2009 | Kisenwether |
| 2009/0275411 | A1 | 11/2009 | Kisenwether |
| 2009/0280910 | A1 | 11/2009 | Gagner |
| 2009/0282469 | A1 | 11/2009 | Lynch |
| 2009/0298468 | A1 | 12/2009 | Hsu |
| 2009/0318219 | A1 | 12/2009 | Koustas |
| 2010/0002897 | A1 | 1/2010 | Keady |
| 2010/0004058 | A1 | 1/2010 | Acres |
| 2010/0016069 | A1 | 1/2010 | Herrmann |
| 2010/0049738 | A1 | 2/2010 | Mathur |
| 2010/0056248 | A1 | 3/2010 | Acres |
| 2010/0062833 | A1 | 3/2010 | Mattice |
| 2010/0062840 | A1 | 3/2010 | Herrmann |
| 2010/0069160 | A1 | 3/2010 | Barrett |
| 2010/0079237 | A1 | 4/2010 | Falk |
| 2010/0081501 | A1 | 4/2010 | Carpenter |
| 2010/0081509 | A1 | 4/2010 | Burke |
| 2010/0099499 | A1 | 4/2010 | Amaitis |
| 2010/0105454 | A1 | 4/2010 | Weber |
| 2010/0106612 | A1 | 4/2010 | Gupta |
| 2010/0115591 | A1 | 5/2010 | Kane-Esrig |
| 2010/0120486 | A1 | 5/2010 | Dewaal |
| 2010/0124967 | A1 | 5/2010 | Lutnick |
| 2010/0130276 | A1 | 5/2010 | Fiden |
| 2010/0160035 | A1 | 6/2010 | Herrmann |
| 2010/0160043 | A1 | 6/2010 | Fujimoto |
| 2010/0178977 | A1 | 7/2010 | Kim |
| 2010/0184509 | A1 | 7/2010 | Sylla |
| 2010/0197383 | A1 | 8/2010 | Rader |
| 2010/0197385 | A1 | 8/2010 | Aoki |
| 2010/0203955 | A1 | 8/2010 | Sylla |
| 2010/0203957 | A1 | 8/2010 | Enzminger |
| 2010/0203963 | A1 | 8/2010 | Allen |
| 2010/0224681 | A1 | 9/2010 | Triplett |
| 2010/0227662 | A1 | 9/2010 | Speer, II |
| 2010/0227670 | A1 | 9/2010 | Arezina |
| 2010/0227671 | A1 | 9/2010 | Laaroussi |
| 2010/0227687 | A1 | 9/2010 | Speer, II |
| 2010/0234091 | A1 | 9/2010 | Baerlocher |
| 2010/0279764 | A1 | 11/2010 | Allen |
| 2010/0323780 | A1 | 12/2010 | Acres |
| 2010/0325703 | A1 | 12/2010 | Etchegoyen |
| 2011/0009181 | A1 | 1/2011 | Speer, II |
| 2011/0034252 | A1 | 2/2011 | Morrison |
| 2011/0039615 | A1 | 2/2011 | Acres |
| 2011/0053679 | A1 | 3/2011 | Canterbury |
| 2011/0065492 | A1 | 3/2011 | Acres |
| 2011/0076941 | A1 | 3/2011 | Taveau |
| 2011/0086696 | A1 | 4/2011 | Macewan |
| 2011/0105216 | A1 | 5/2011 | Cohen |
| 2011/0111827 | A1 | 5/2011 | Nicely |
| 2011/0111843 | A1 | 5/2011 | Nicely |
| 2011/0111860 | A1 | 5/2011 | Nguyen |
| 2011/0118010 | A1 | 5/2011 | Brune |
| 2011/0159966 | A1 | 6/2011 | Gura |
| 2011/0183732 | A1 | 7/2011 | Block |
| 2011/0183749 | A1 | 7/2011 | Allen |
| 2011/0207525 | A1 | 8/2011 | Allen |
| 2011/0212711 | A1 | 9/2011 | Scott |
| 2011/0212767 | A1 | 9/2011 | Barclay |
| 2011/0223993 | A1 | 9/2011 | Allen |
| 2011/0244952 | A1 | 10/2011 | Schueller |
| 2011/0263318 | A1 | 10/2011 | Agarwal |
| 2011/0269548 | A1 | 11/2011 | Barclay |
| 2011/0306400 | A1 | 12/2011 | Nguyen |
| 2011/0306426 | A1 | 12/2011 | Novak |
| 2012/0015709 | A1 | 1/2012 | Bennett |
| 2012/0028703 | A1 | 2/2012 | Anderson |
| 2012/0028718 | A1 | 2/2012 | Barclay |
| 2012/0034968 | A1 | 2/2012 | Watkins |
| 2012/0046096 | A1 | 2/2012 | Morrison |
| 2012/0046110 | A1 | 2/2012 | Amaitis |
| 2012/0094769 | A1 | 4/2012 | Nguyen |
| 2012/0100908 | A1 | 4/2012 | Wells |
| 2012/0108319 | A1 | 5/2012 | Caputo |
| 2012/0115591 | A1 | 5/2012 | Palermo |
| 2012/0122561 | A1 | 5/2012 | Hedrick |
| 2012/0122567 | A1 | 5/2012 | Gangadharan |
| 2012/0122584 | A1 | 5/2012 | Nguyen |
| 2012/0122590 | A1 | 5/2012 | Nguyen |
| 2012/0172130 | A1 | 7/2012 | Acres |
| 2012/0184362 | A1 | 7/2012 | Barclay |
| 2012/0184363 | A1 | 7/2012 | Barclay |
| 2012/0185398 | A1 | 7/2012 | Weis |
| 2012/0190426 | A1 | 7/2012 | Acres |
| 2012/0194448 | A1 | 8/2012 | Rothkopf |
| 2012/0208618 | A1 | 8/2012 | Frerking |
| 2012/0231885 | A1 | 9/2012 | Speer, II |

(56) References Cited

U.S. PATENT DOCUMENTS

| | | | |
|---|---|---|---|
| 2012/0239566 | A1 | 9/2012 | Everett |
| 2012/0322563 | A1 | 12/2012 | Nguyen |
| 2012/0330740 | A1 | 12/2012 | Pennington |
| 2013/0005433 | A1 | 1/2013 | Holch |
| 2013/0005443 | A1 | 1/2013 | Kosta |
| 2013/0005453 | A1 | 1/2013 | Nguyen |
| 2013/0059650 | A1 | 3/2013 | Sylla |
| 2013/0065668 | A1 | 3/2013 | Lemay |
| 2013/0103965 | A1 | 4/2013 | Golembeski, Jr. |
| 2013/0104193 | A1 | 4/2013 | Gatto |
| 2013/0130766 | A1 | 5/2013 | Harris |
| 2013/0132745 | A1 | 5/2013 | Schoening |
| 2013/0165210 | A1 | 6/2013 | Nelson |
| 2013/0185559 | A1 | 7/2013 | Morel |
| 2013/0196756 | A1 | 8/2013 | Nguyen |
| 2013/0196776 | A1 | 8/2013 | Nguyen |
| 2013/0210513 | A1 | 8/2013 | Nguyen |
| 2013/0210514 | A1 | 8/2013 | Nguyen |
| 2013/0210530 | A1 | 8/2013 | Nguyen |
| 2013/0225279 | A1 | 8/2013 | Patceg |
| 2013/0225282 | A1 | 8/2013 | Williams |
| 2013/0252730 | A1 | 9/2013 | Joshi |
| 2013/0281187 | A1 | 10/2013 | Skelton |
| 2013/0281188 | A1 | 10/2013 | Guinn |
| 2013/0316808 | A1 | 11/2013 | Nelson |
| 2013/0337878 | A1 | 12/2013 | Shepherd |
| 2013/0337889 | A1 | 12/2013 | Gagner |
| 2014/0006129 | A1 | 1/2014 | Heath |
| 2014/0057716 | A1 | 2/2014 | Massing |
| 2014/0087862 | A1 | 3/2014 | Burke |
| 2014/0094295 | A1 | 4/2014 | Nguyen |
| 2014/0094316 | A1 | 4/2014 | Nguyen |
| 2014/0120999 | A1 | 5/2014 | Graves |
| 2014/0121005 | A1 | 5/2014 | Nelson |
| 2014/0179431 | A1 | 6/2014 | Nguyen |
| 2014/0221071 | A1 | 8/2014 | Calio |
| 2014/0274306 | A1 | 9/2014 | Crawford, III |
| 2014/0274309 | A1 | 9/2014 | Nguyen |
| 2014/0274319 | A1 | 9/2014 | Nguyen |
| 2014/0274320 | A1 | 9/2014 | Nguyen |
| 2014/0274342 | A1 | 9/2014 | Nguyen |
| 2014/0274357 | A1 | 9/2014 | Nguyen |
| 2014/0274360 | A1 | 9/2014 | Nguyen |
| 2014/0274367 | A1 | 9/2014 | Nguyen |
| 2014/0274388 | A1 | 9/2014 | Nguyen |
| 2015/0089595 | A1 | 3/2015 | Telles |
| 2015/0133223 | A1 | 5/2015 | Carter, Sr. |
| 2015/0143543 | A1 | 5/2015 | Phegade |
| 2015/0287283 | A1 | 10/2015 | Yarbrough |
| 2016/0093154 | A1 | 3/2016 | Bytnar |
| 2016/0125695 | A1 | 5/2016 | Nguyen |
| 2017/0016819 | A1 | 1/2017 | Barwicz |
| 2017/0116819 | A1 | 4/2017 | Nguyen |
| 2017/0116823 | A1 | 4/2017 | Nguyen |
| 2017/0144071 | A1 | 5/2017 | Nguyen |
| 2017/0148259 | A1 | 5/2017 | Nguyen |
| 2017/0148261 | A1 | 5/2017 | Nguyen |
| 2017/0148263 | A1 | 5/2017 | Nguyen |
| 2017/0206734 | A1 | 7/2017 | Nguyen |
| 2017/0228979 | A1 | 8/2017 | Nguyen |
| 2017/0243440 | A1 | 8/2017 | Nguyen |
| 2017/0337770 | A1 | 11/2017 | Nguyen |
| 2018/0144581 | A1 | 5/2018 | Nguyen |
| 2019/0005773 | A1 | 1/2019 | Nguyen |
| 2019/0122490 | A1 | 4/2019 | Nguyen |
| 2019/0122492 | A1 | 4/2019 | Nguyen |
| 2019/0213829 | A1 | 7/2019 | Nguyen |
| 2020/0372753 | A1 | 11/2020 | Nguyen |

FOREIGN PATENT DOCUMENTS

| | | | |
|---|---|---|---|
| GB | 2096376 | A | 10/1982 |
| GB | 2097570 | A | 11/1982 |
| GB | 2335524 | A | 9/1999 |
| JP | 12005000454 | | 5/2007 |
| WO | 2005073933 | | 8/2005 |
| WO | 2008027621 | | 3/2008 |
| WO | 2009026309 | | 2/2009 |
| WO | 2009062148 | | 5/2009 |
| WO | 2010017252 | | 2/2010 |

OTHER PUBLICATIONS

Finnegan, Amanda, "Casinos Connecting with Customers via iphone Apps", May 27, 2010, Las Vegas Sun, Las Vegas, NV.
Gaming Today Staff, "Slots showcased at 2009 National Indian Gaming Assoc.", GamingToday.com, Apr. 14, 2009.
Green, Marian,"Testing Texting Casino Journal", Mar. 2, 2009.
Hasan, Ragib, et al., "A Survey of Peer-to-Peer Storage Techniques for Distributed File Systems", National Center for Supercomputing Applications, Department of Computer Science, University of Illinois at Urbana Champaign, Jun. 27, 2005.
Jones, Trahern, "Telecon-equipped drones could revolutionize wireless market", azcentral.com, http://www.azcentral.com/business/news/articles/20130424telecom-equipped-drones-could-revolutionize-wireless-market.html, downloaded Jul. 2, 2013, 2 pages.
Yancey, Kitty Bean, "Navigate Around Vegas with New iPhone Apps", USA Today, Jun. 3, 2010.
IAPS, Daily Systems LLC, 2010.
Brochure, 5000 Ft. Inc., 1 page, Nov. 2010.
Frontier Fortune game, email notification, MGM Resorts Intl., Aug. 9, 2013.
"Getting Back in the Game: Geolocation Can Ensure Compliance with New iGaming Regulations", White Paper, Quova, Inc., 2010.
Restriction Requirement for U.S. Appl. No. 13/801,256, dated Dec. 30, 2013.
Office Action for U.S. Appl. No. 13/801,171, dated Dec. 26, 2013.
Office Action for U.S. Appl. No. 13/801,234, dated Jan. 10, 2014.
Final Office Action for U.S. Appl. No. 13/296,182, dated Feb. 12, 2014.
Office Action for U.S. Appl. No. 12/617,717, dated Feb. 25, 2014.
Office Action for U.S. Appl. No. 13/801,076, dated Mar. 28, 2014.
Final Office Action for U.S. Appl. No. 13/633,118, dated Apr. 3, 2014.
Office Action for U.S. Appl. No. 13/843,192, dated Apr. 3, 2014.
Office Action for U.S. Appl. No. 13/632,743, dated Apr. 10, 2014.
Office Action for U.S. Appl. No. 13/801,121, dated Apr. 11, 2014.
Final Office Action for U.S. Appl. No. 12/945,889, dated Jun. 30, 2014.
Notice of Allowance for U.S. Appl. No. 12/617,717, dated Jul. 14, 2014.
Office Action for U.S. Appl. No. 13/801,121, dated Sep. 24, 2014.
Office Action for U.S. Appl. No. 13/801,171, dated Sep. 22, 2014.
Office Action for U.S. Appl. No. 13/801,234, dated Oct. 1, 2014.
Final Office Action for U.S. Appl. No. No. 13/843,192, dated Oct. 21, 2014.
Office Action for U.S. Appl. No. 13/632,743, dated Oct. 23, 2014.
Office Action for U.S. Appl. No. 13/632,828, dated Nov. 7, 2014.
Office Action fpr U.S. Appl. No. 12/797,610, dated Dec. 15, 2014.
Final Office Action for U.S. Appl. No. 12/945,889, dated Feb. 12, 2015.
Final Office Action for U.S. Appl. No. 13/801,171, dated Mar. 16, 2015.
Office Action for U.S. Appl. No. 12/945,889, dated Oct. 23, 2014.
Office Action for U.S. Appl. No. 13/632,828, mailed Apr. 10, 2015.
Final Office Action for U.S. Appl. No. 13/801,121, dated Apr. 21, 2015.
Final Office Action for U.S. Appl. No. 13/557,063, dated Apr. 28, 2015.
Office Action for U.S. Appl. No. 13/296,182, dated Jun. 5, 2015.
Office Action for U.S. Appl. No. 12/797,610, dated Jul. 14, 2015.
Final Office Action for U.S. Appl. No. 13/833,953, dated Jul. 17, 2015.
Notice of Allowance for U.S. Appl. No. 12/945,889, dated Jul. 22, 2015.
Office Action for U.S. Appl. No. 12/797,616, dated Aug. 10, 2015.

(56) References Cited

OTHER PUBLICATIONS

Final Office Action for U.S. Appl. No. 13/801,234, dated Aug. 14, 2015.
Office Action for U.S. Appl. No. 13/801,121, dated Oct. 2, 2015.
Office Action for U.S. Appl. No. 14/017,150, dated Oct. 7, 2015.
Office Action for U.S. Appl. No. 14/017,159, dated Oct. 7, 2015.
Office Action for U.S. Appl. No. 13/801,271 dated Oct. 19, 2015.
Office Action for U.S. Appl. No. 14/211,536 dated Oct. 19, 2015.
Final Office Action for U.S. Appl. No. 13/632,828, dated Oct. 22, 2015.
Office Action for U.S. Appl. No. 14/217,066, dated Dec. 17, 2015.
Notice of Allowance for U.S. Appl. No. 13/557,063, dated Dec. 23, 2015.
Final Office Action for U.S. Appl. No. 15/427,308, dated Nov. 27, 2019.
Office Action for U.S. Appl. No. 15/798,363, dated Jan. 8, 2020.
Office Action for U.S. Appl. No. 15/495,975, dated Mar. 17, 2020.
Office Action for U.S. Appl. No. 16/248,759, dated Apr. 1, 2020.
Final Office Action for U.S. Appl. No. 14/017,150, dated Apr. 17, 2020.
Notice of Allowance for U.S. Appl. No. 15/798,363, dated May 12, 2020.
Office Action for U.S. Appl. No. 16/357,316, dated May 21, 2020.
Office Action for U.S. Appl. No. 16/190,050, dated Jun. 1, 2020.
Office Action for U.S. Appl. No. 15/674,480, dated Jun. 5, 2020.
Notice of Allowance for U.S. Appl. No. 15/480,295, dated Jun. 15, 2020.
Office Action for U.S. Appl. No. 13/622,702, dated Jun. 22, 2020.
Office Action for U.S. Appl. No. 15/811,654, dated Jun. 26, 2020.
Office Action for U.S. Appl. No. 16/579,754, dated Jul. 22, 2020.
Office Action for U.S. Appl. No. 16/559,553, dated Sep. 11, 2020.
Office Action for U.S. Appl. No. 16/794,212, dated Sep. 11, 2020.
Restriction Requirement for U.S. Appl. No. 16/600,395, dated Sep. 18, 2020.
Final Office Action for U.S. Appl. No. 16/248,759, dated Oct. 6, 2020.
Final Office Action for U.S. Appl. No. 15/671,133, dated Oct. 7, 2020.
Final Office Action for U.S. Appl. No. 16/357,316, dated Oct. 8, 2020.
Final Office Action for U.S. Appl. No. 16/183,632, dated Oct. 9, 2020.
Office Action for U.S. Appl. No. 16/590,347, dated Oct. 13, 2020.
"Professional Casino Slot Machine", Posted at www.vbtutor.net/VB. Sample/vbslot2.htm on Oct. 20, 2009.
Office Action for U.S. Appl. No. 16/162,358, dated Dec. 31, 2018.
Office Action (Notice of Allowance and Fees Due (PTOL-85)) dated Mar. 22, 2022 for U.S. Appl. No. 16/248,759 (pp. 1-9).
Office Action (Notice of Allowance and Fees Due (PTOL-85)) dated Apr. 11, 2022 for U.S. Appl. No. 16/248,759 (pp. 1-6).
Office Action for U.S. Appl. No. 16/559,553, mailed Jun. 1, 2021.
Notice of Allowance for U.S. Appl. No. 16/579,754, mailed Jul. 16, 2021.
Office Action for U.S. Appl. No. 13/622,702, mailed Jul. 19, 2021.
Office Action for U.S. Appl. No. 16/357,316, mailed Jul. 20, 2021.
Office Action for U.S. Appl. No. 16/993,154, mailed Jul. 28, 2021.
Office Action (Notice of Allowance and Fees Due (PTOL-85)) dated Apr. 7, 2022 for U.S. Appl. No. 14/017,159 (pp. 1-8).
Office Action (Non-Final Rejection) dated Apr. 20, 2022 for U.S. Appl. No. 17/306,946 (pp. 1-6).
Office Action (Non-Final Rejection) dated Jun. 6, 2022 for U.S. Appl. No. 16/248,759 (pp. 1-10).
Final Office Action for U.S. Appl. No. 16/794,212, dated Feb. 17, 2021.
Office Action for U.S. Appl. No. 16/351,416, dated Feb. 23, 2021.
Office Action for U.S. Appl. No. 15/674,480, dated Mar. 25, 2021.
Final Office Action for U.S. Appl. No. 16/219,940, dated Mar. 26, 2021.
Office Action for U.S. Appl. No. 16/183,632, dated May 4, 2021.
Office Action (Non-Final Rejection) dated Sep. 8, 2022 for U.S. Appl. No. 17/485,289 (pp. 1-5).
Office Action (Notice of Allowance and Fees Due (PTOL-85)) dated Nov. 7, 2022 for U.S. Appl. No. 16/248,759 (pp. 1-9).
Office Action (Notice of Allowance and Fees Due (PTOL-85)) dated Sep. 29, 2022 for U.S. Appl. No. 17/306,946 (pp. 1-8).
Office Action (Non-Final Rejection) dated Oct. 6, 2022 for U.S. Appl. No. 17/160,343 (pp. 1-15).
Office Action (Notice of Allowance and Fees Due (PTOL-85)) dated Dec. 27, 2022 for U.S. Appl. No. 17/485,289 (pp. 1-8).
Office Action (Non-Final Rejection) dated Jan. 13, 2023 for U.S. Appl. No. 17/337,393 (pp. 1-5).
Office Action (Non-Final Rejection) dated Mar. 22, 2023 for U.S. Appl. No. 16/248,759 (pp. 1-18).
Office Action (Notice of Allowance and Fees Due (PTOL-85)) dated Feb. 2, 2023 for U.S. Appl. No. 17/306,946 (pp. 1-7).
Office Action (Notice of Allowance and Fees Due (PTOL-85)) dated May 25, 2023 for U.S. Appl. No. 17/337,393 (pp. 1-7).
Office Action (Final Rejection) dated Jun. 7, 2023 for U.S. Appl. No. 17/160,343 (pp. 1-19).
Office Action for U.S. Appl. No. 13/296,182, dated Dec. 23, 2015.
Final Office Action for U.S. Appl. No. 13/843,192, dated Dec. 30, 2015.
Office Action for U.S. Appl. No. 13/801,076, dated Jan. 11, 2016.
Office Action for U.S. Appl. No. 12/945,888, dated Jan. 22, 2016.
Final Office Action for U.S. Appl. No. 12/797,616, dated Jun. 12, 2016.
Office Action for U.S. Appl. No. 13/843,087, dated Feb. 25, 2016.
Office Action for U.S. Appl. No. 13/800,917, dated Feb. 25, 2016.
Advisory Action for U.S. Appl. No. 13/632,828, dated Feb. 25, 2016.
Office Action for U.S. Appl. No. 13/801,234, dated Mar. 8, 2016.
Office Action for U.S. Appl. No. 14/216,986, dated Mar. 9, 2016.
Final Office Action for U.S. Appl. No. 13/801,271, dated Mar. 11, 2016.
Final Office Action for U.S. Appl. No. 13/633,118, dated Mar. 24, 2016.
Final Office Action for U.S. Appl. No. 14/189,948, dated Apr. 6, 2016.
Final Office Action for U.S. Appl. No. 12/797,610, dated Apr. 21, 2016.
Final Office Action for U.S. Appl. No. 14/017,150, dated Apr. 26, 2016.
Final Office Action for U.S. Appl. No. 13/801,121, dated May 11, 2016.
Office Action for U.S. Appl. No. 13/801,171, dated Jun. 6, 2016.
Final Office Action for U.S. Appl. No. 12/945,888, dated Jun. 28, 2016.
Notice of Allowance for U.S. Appl. No. 13/833,953, dated Jul. 6, 2016.
Final Office Action for U.S. Appl. No. 13/801,171, dated May 21, 2014.
Final Office Action for U.S. Appl. No. 13/801,234, dated May 22, 2014.
Office Action for U.S. Appl. No. 14/211,536, dated Jul. 13, 2016.
Notice of Allowance for U.S. Appl. No. 13/801,076, dated Jul. 11, 2016.
Office Action for U.S. Appl. No. 13/296,182, dated Jul. 20, 2016.
Advisory Action for U.S. Appl. No. 13/296,182, dated May 8, 2014.
Notice of Allowance for U.S. Appl. No. 13/843,192, dated Aug. 10, 2016.
Final Office Action for U.S. Appl. No. 14/211,536, dated Nov. 14, 2016.
Office Action for U.S. Appl. No. 14/017,159, dated Jan. 11, 2019.
Office Action for U.S. Appl. No. 15/426,898, dated Jan. 11, 2019.
Final Office Action for U.S. Appl. No. 15/495,973, dated Jan. 11, 2019.
Office Action for U.S. Appl. No. 14/216,986, dated Jan. 14, 2019.
Office Action for U.S. Appl. No. 15/427,307, dated Jan. 18, 2019.
Final Office Action for U.S. Appl. No. 15/798,363, dated Feb. 4, 2019.
Office Action for U.S. Appl. No. 16/125,614, dated Feb. 25, 2019.

(56) References Cited

OTHER PUBLICATIONS

Final Office Action for U.S. Appl. No. 15/495,975, dated Apr. 18, 2019.
Office Action for U.S. Appl. No. 15/671,133, dated May 1, 2019.
Notice of Allowance for U.S. Appl. No. 14/216,986, dated May 17, 2019.
Notice of Allowance for U.S. Appl. No. 14/518,909, dated May 17, 2019.
Office Action for U.S. Appl. No. 12/797,616, dated Jun. 5, 2019.
Office Action for U.S. Appl. No. 15/427,308, dated Jun. 14, 2019.
Office Action for U.S. Appl. No. 15/811,654, dated Jun. 14, 2019.
Office Action for U.S. Appl. No. 15/674,480, dated Jun. 20, 2019.
Notice of Allowance for U.S. Appl. No. 15/835,448, dated Jul. 3, 2019.
Final Office Action for U.S. Appl. No. 16/162,358, dated Jul. 11, 2019.
Office Action for U.S. Appl. No. 16/190,050, dated Sep. 19, 2019.
Office Action for U.S. Appl. No. 14/017,150, dated Oct. 9, 2019.
Final Office Action for U.S. Appl. No. 15/671,133, dated Oct. 18, 2019.
Office Action for U.S. Appl. No. 15/835,448, dated Oct. 22, 2019.
Notice of Allowance for U.S. Appl. No. 15/495,975, dated Oct. 23, 2019.
Office Action for U.S. Appl. No. 16/449,717, dated Nov. 9, 2020.
Final Office Action for U.S. Appl. No. 13/622,702, dated Nov. 30, 2020.
Final Office Action for U.S. Appl. No. 15/674,480, dated Dec. 7, 2020.
Office Action for U.S. Appl. No. 16/168,813, dated Dec. 8, 2020.
Office Action for U.S. Appl. No. 16/600,395, dated Dec. 22, 2020.
Office Action (Non-Final Rejection) dated Sep. 8, 2023 for U.S. Appl. No. 17/160,343 (pp. 1-24).
Office Action dated Mar. 28, 2024 for U.S. Appl. No. 18/234,503 (pp. 1-10).

* cited by examiner

ADAPTIVE MOBILE DEVICE GAMING SYSTEM

CROSS-REFERENCE TO OTHER APPLICATIONS

This application is a continuation of U.S. patent application Ser. No. 17/306,946, filed May 4, 2021, and entitled "ADAPTIVE MOBILE DEVICE GAMING SYSTEM", which is hereby incorporated by reference herein, and which in turn is a continuation of U.S. patent application Ser. No. 16/590,347, filed Oct. 1, 2019, and entitled "ADAPTIVE MOBILE DEVICE GAMING SYSTEM", which is hereby incorporated by reference herein, and which in turn is a continuation of U.S. patent application Ser. No. 16/143,428, filed Sep. 26, 2018, and entitled "ADAPTIVE MOBILE DEVICE GAMING SYSTEM", which is hereby incorporated by reference herein, and which in turn is a continuation of U.S. patent application Ser. No. 15/427,291, filed Feb. 8, 2017, and entitled "ADAPTIVE MOBILE DEVICE GAMING SYSTEM", which is hereby incorporated by reference herein, and which in turn is a continuation of U.S. patent application Ser. No. 14/211,536, filed Mar. 14, 2014, and entitled "ADAPTIVE MOBILE DEVICE GAMING SYSTEM", which is hereby incorporated by reference herein, and which in turn claims priority to (i) U.S. Provisional Patent Application No. 61/873,300, filed Sep. 3, 2013, and entitled "ADAPTIVE MOBILE DEVICE GAMING SYSTEM", which is hereby incorporated by reference herein; and (ii) U.S. Provisional Patent Application No. 61/799,862, filed Mar. 15, 2013, and entitled "ADAPTIVE MOBILE DEVICE GAMING SYSTEM", which is hereby incorporated by reference herein.

This application also incorporates by reference herein the following applications: (i) U.S. patent application Ser. No. 14/017,159 filed Sep. 3, 2013, and entitled "METHOD AND SYSTEM FOR LOCALIZED MOBILE GAMING"; and (ii) U.S. patent application Ser. No. 14/017,150 filed Sep. 3, 2013, and entitled "METHOD AND SYSTEM FOR LOCALIZED MOBILE GAMING".

BACKGROUND OF THE INVENTION

Today, mobile betting is available at designated sports betting areas of casinos. However, this means that mobile betting is not available when one is not at a designated sports betting area. This is a burden to customer and leads to limited opportunities for sports betting. Mobile gaming has been contemplated but gaming regulations hinder its implementation.

Portable electronic devices represent an alternative means to desktop computers to allow users to more conveniently interact with a variety of multimedia services. For example, many portable electronic devices may be configured to allow for the user to interact with multimedia services, messaging services, internet browsing services, telephone services, and the like. Furthermore, the software of portable electronic devices may be configured to be updated so as allow for the presentation of additional multimedia services or applications. Portable electronic devices may also be configured to have wireless transmission and receiving capabilities so as to permit communication with one or more other sources.

Hence, there is a need for improved approaches to enhance mobile betting or gaming opportunities.

SUMMARY

Embodiments disclosed herein concern mobile gaming environments. Portable electronic devices can be supported by the mobile gaming environments. The locations of the portable electronic devices can influence how the portable electronic devices operate and/or what services or features are available to the portable electronic device or their users.

According to one embodiment, a mobile gaming system can concern gaming/betting opportunities that can be secured using a portable electronic device even when an individual is located in a location where betting or games of chance are not permitted. A betting opportunity that has been secured can later be activated when the portable electronic device associated with the individual later resides in a location where betting or games of chance are permitted.

According to another embodiment, a mobile gaming system can concern an application program operating on a portable electronic device that supports multiple modes of operation depending upon whether the portable electronic device is in a location where betting or games of chance are permitted. The application can adapt or transform itself (i.e., switch modes), automatically or with user assistance, depending upon whether the portable electronic device is in a location where betting or games of chance are permitted. When the portable electronic device is in a location where betting or games of chance are not permitted, the application program can still operate (i.e., permit non-wagering usage) and enable its user to earn rewards, advantages, tools, etc. without actually betting (e.g., wagering). Further, the rewards, advantages, tools, etc. being earned can be used directly or can be used following a conversion to something useable in betting/games of chance when the portable electronic device is later located where betting or games of chance is permitted. The application program can also allow the user to play a betting/game of chance for practice or for simulation of virtual betting.

The invention can be implemented in numerous ways, including as a method, system, device, apparatus (including computer readable medium and graphical user interface). Several embodiments of the invention are discussed below.

As a non-transitory computer readable medium including at least computer program code for an application program stored thereon, where the application program is executable by a computing device, one embodiment can, for example, include at least: computer program code for determining whether the computing device is in a gaming authorized location or a gaming unauthorized location; computer program code for operating the application program in a non-gaming mode if the location of the computing device is located in a gaming unauthorized location; and computer program code for operating the application program in a gaming mode if the location of the computing device is located in a gaming authorized location.

As a method for facilitating gaming via portable electronic devices, one embodiment can, for example, include at least: causing a betting opportunity to be presented to a user via a portable electronic device associated with the user; receiving, at a gaming server, a bet amount for the betting opportunity from the portable electronic device; determining whether the portable electronic device is in a betting authorized location; placing a bet corresponding to the betting opportunity in the bet amount for the user if the determining determines that the portable electronic device is in a betting authorized location; and deferring placing of the bet corresponding to the betting opportunity in the bet amount for the user if the determining determines that the portable electronic device is not in a betting authorized location.

As a non-transitory computer readable medium including at least computer program code for an application program stored thereon, where the application program is executable by a computing device, one embodiment can, for example, include at least: computer program code for causing presentment of a betting opportunity via the application program; computer program code for determining whether a user of the application program desires to pursue the betting opportunity; computer program code for determining whether the computing device is in a gaming authorized location or a gaming unauthorized location; and computer program code for initiating locking in the betting opportunity for future execution for the user of the computing device is determined to be in a gaming unauthorized location.

As a method for provided a betting opportunity using a portable electronic device, one embodiment can, for example, include at least: causing presentment of a betting opportunity via the portable electronic device; determining whether a user of the portable electronic device desires to pursue the betting opportunity; determining whether the portable electronic device is in a gaming authorized location or a gaming unauthorized location; and initiating locking in the betting opportunity for future execution if the portable electronic device subsequently is determined to be in a gaming authorized location.

As a method for facilitating gaming via portable electronic devices, one embodiment can, for example, include at least: displaying a betting opportunity to a user via a portable electronic device associated with the user; receiving, using the portable electronic device, a bet amount for the betting opportunity; displaying a bet option fee for locking in a bet option to make the bet amount; receiving, using the portable electronic device, an acceptance of the bet option fee; and initiating locking of the option to make the bet amount for the user.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like elements, and in which.

DETAILED DESCRIPTION OF CERTAIN EMBODIMENTS

Embodiments disclosed herein concern mobile gaming environments. Portable electronic devices can be supported by the mobile gaming environments. The locations of the portable electronic devices can influence how the portable electronic devices operate or what services or features are available to the portable electronic device or their users.

According to one embodiment, a mobile gaming system can concern gaming/betting opportunities that can be secured using a portable electronic device even when an individual is located in a location where betting or games of chance are not permitted. A betting opportunity that has been secured can later be activated when the portable electronic device associated with the individual later resides in a location where betting or games of chance are permitted.

According to another embodiment, a mobile gaming system can concern an application program operating on a portable electronic device that supports multiple modes of operation depending upon whether the portable electronic device is in a location where betting or games of chance are permitted. The application can adapt or transform itself (i.e., switch modes), automatically or with user assistance, depending upon whether the portable electronic device is in a location where betting or games of chance are permitted. When the portable electronic device is in a location where betting or games of chance are not permitted, the application program can still operate (i.e., permit non-wagering usage) and enable its user to earn rewards, advantages, tools, etc. without actually betting (e.g., wagering). Further, the rewards, advantages, tools, etc. being earned can be used directly or can be used following a conversion to something useable in betting/games of chance when the portable electronic device is later located where betting or games of chance is permitted. The application program can also allow the user to play a betting/game of chance for practice or for simulation of virtual betting.

Embodiments of various aspects of the invention are discussed below with reference to FIGS. 1-6. However, those skilled in the art will readily appreciate that the detailed description given herein with respect to these figures is for explanatory purposes as the invention extends beyond these limited embodiments.

Figure 1:
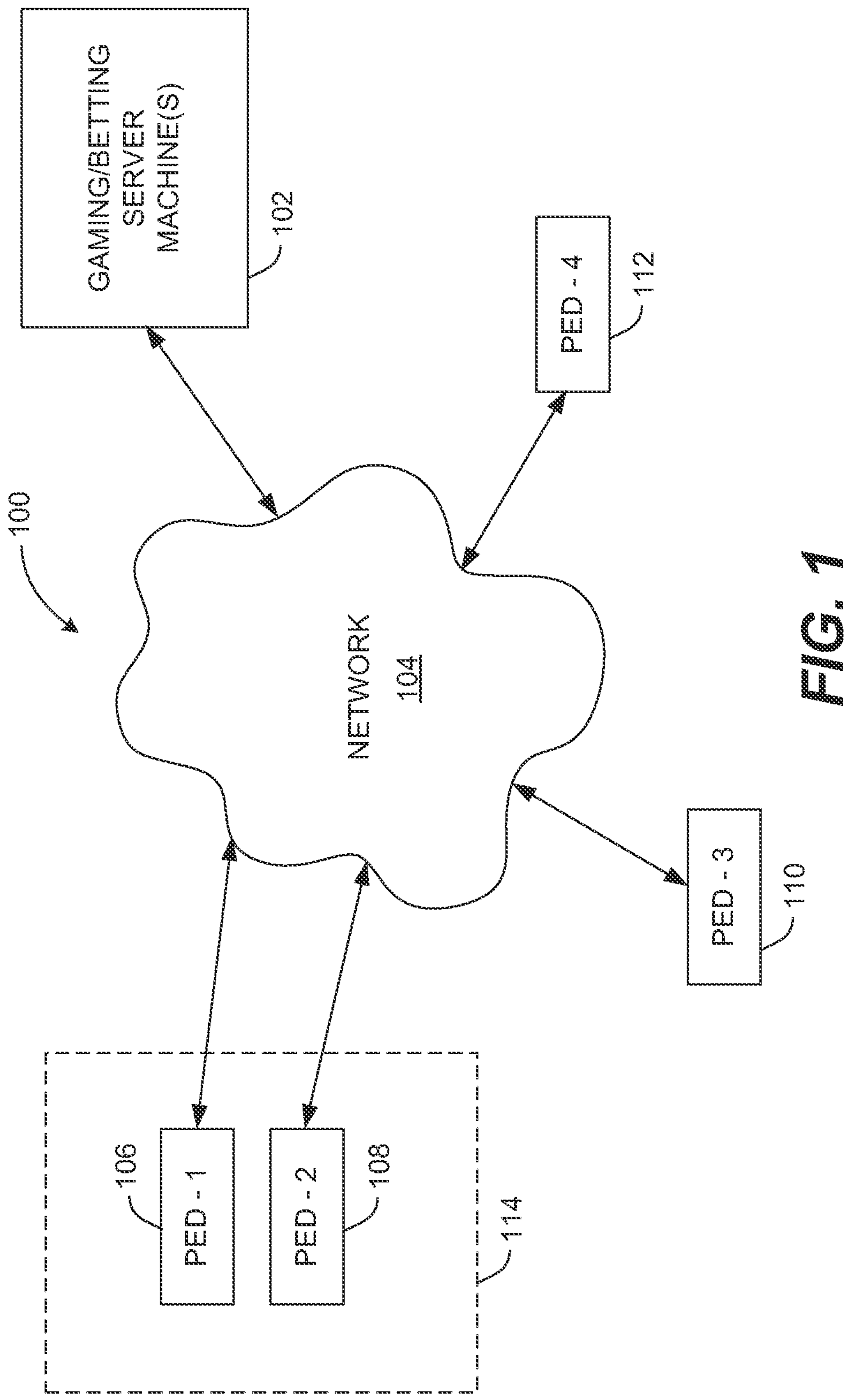
FIG. 1 is a block diagram of a mobile gaming/betting system according to one embodiment.

FIG. 1 is a block diagram of a mobile gaming/betting system 100 according to one embodiment. The mobile gaming/betting system 100 includes a one or more gaming/betting server machines 102. The one or more gaming/betting server machines 102 can manage, coordinate or process gaming/betting with respect to a plurality of portable electronic devices. The gaming/betting server machines 102 can also manage, coordinate or process gaming/betting with respect to other electronic devices, including various games of chance, including stationary gaming machines or stationary table games. The mobile gaming/betting server machines 102 can couple to a network 104. The network 104 can include one or more private networks or public networks, including wired and/or wireless networks. The mobile gaming/betting system 100 can also support a plurality of portable electronic devices (PEDs). As illustrated in FIG. 1, the depicted plurality of PEDs can, in a simplified representative situation, include PED-1 106, PED-2 108, PED-3 110 and PED-4 112. In general, although the PEDs of FIG. 1 can also be referred to as Portable Gaming Devices (PGDs) since they can support gaming/betting.

Given various legal restrictions on gaming or betting, it is often the case that gaming/betting is only available in certain locations. These locations can correspond to states, Indian reservations, casino establishments, or specific areas (such as rooms, floors, tables) at casino establishments or cruise ships. Accordingly, it can be advantageous for the mobile gaming/betting system 102 to control gaming/betting by PEDs based upon the location of the PEDs. As illustrated in FIG. 1, the mobile gaming/betting system 100 can also illustrate a gaming/betting authorized region 114, which represents a location where gaming/betting is permissible. As illustrated in FIG. 1, the PED-1 106 and the PED-2 108 are currently within the gaming/betting authorized region 114. Consequently, the PET-1 106 and the PET-2 108 are permitted to perform gaming/betting activities with assistance of the one or more gaming/betting server machines 102. However, since the PED-3 110 and the PED-4 112 are presently not within a gaming/betting authorized region, these mobile devices are not permitted to participate in gaming/betting activities at this time. It should be understood that at some future point in time, if the PED-3 110 and/or the PED-4 112 are then located in a gaming/betting authorized region, these PEDs 110 and 112 would then be able to participate in gaming/betting activities.

Nevertheless, when the PEDs are not within a gaming/betting authorized region, the PEDs can still operate to facilitate user participation or interaction with users even though gaming/betting activities are not permitted. For example, a player can play along, without placing a monetary wager, with a live table game taking place at a casino. While entertaining, such a practice mode also allows a player to get familiar with a new game, to practice back betting (e.g., betting on the active live players, not on the games), to hone his game strategies, to play along with a friend who is at the casino, etc. The participation or interaction with the PEDs when gaming/betting is unavailable can yield awards, benefits or advantages. In some cases, the awards, benefits or advantages can be used when the PEDs are later in a location where gaming/betting activities are permitted. This participation or interaction can vary depending upon implementation.

In one implementation, an application program operating on a corresponding PED dynamically adjusts (e.g., transforms) its operation depending upon whether gaming/betting activities are permitted. In the case in which gaming/betting activities are not permitted, the application program can allow non-gaming play in which a user can accrue awards or other benefits (e.g., coupons, points, tools, virtual goods, secret prizes, etc.) that may or may not be able to be used directly in the application program when the PED is later within a gaming/betting authorized region. One example of a tool that could be accrued is a gaming tool to give the user a guide or hint as to desirable location, machines or action within a casino establishment. Virtual goods are game assets (e.g., game currency) that normally do not have value outside of the game or outside of a designated gaming location. Secret prizes maybe awarded in play-along game mode, but can only be revealed and redeemed by the user at designated gaming locations.

In another implementation, a PED, or an application program operating on the PED, can permit a user to secure a bet opportunity even while in a location that is not a gaming/betting authorized region. For example, the PED can facilitate the user in securing an option to later activate a bet when the PED is within a gaming/betting authorized region. In effect, the PED can operate to provide deferred betting (e.g., sports betting), whereby a bet is reserved until the PED and its user are in a location that is gaming/betting authorized.

Figure 2A:
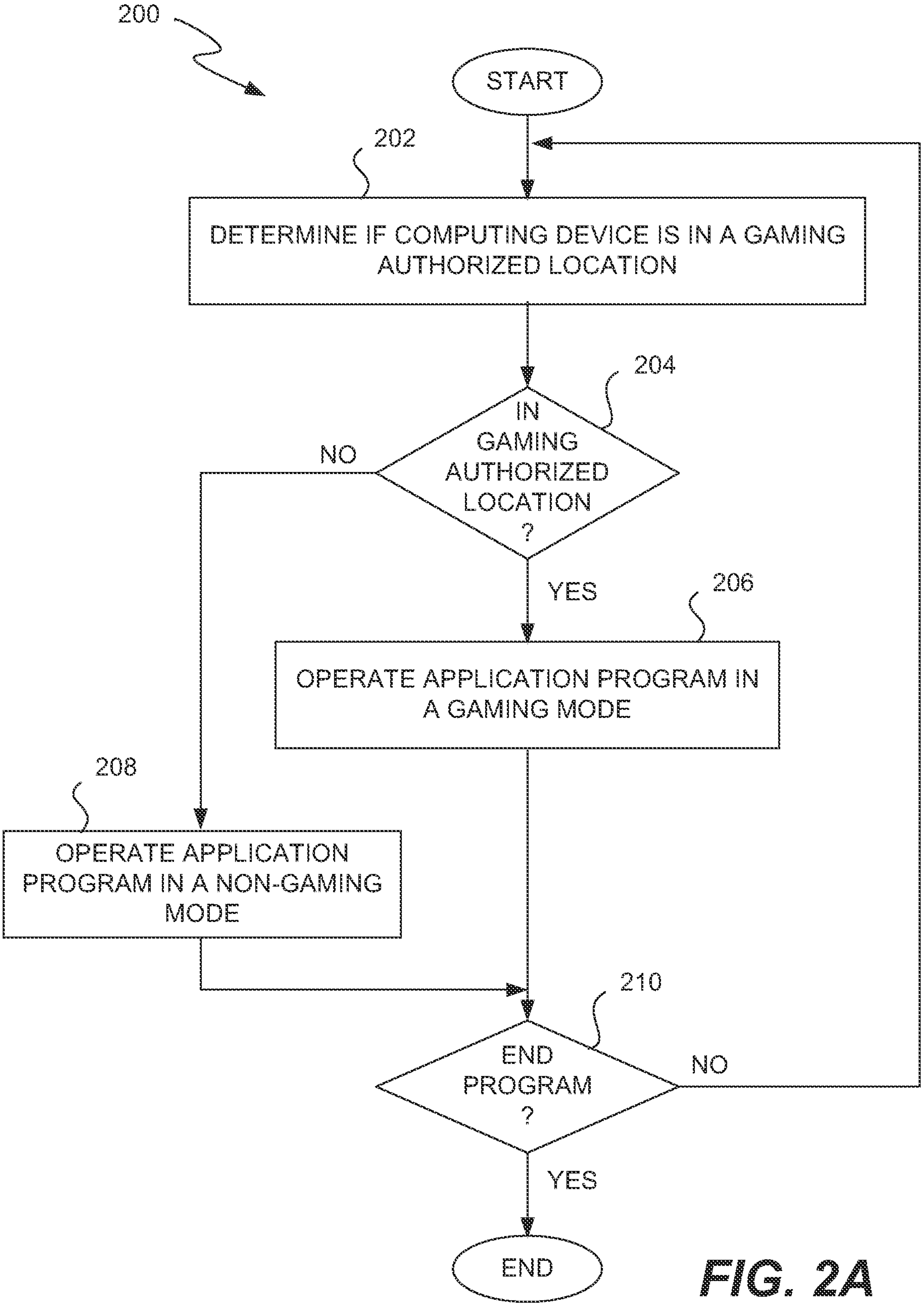
FIG. 2A is a flow diagram of an application mode process according to one embodiment.

FIG. 2A is a flow diagram of an application mode process 200 according to one embodiment. The application mode process 200 can be performed by a computing device. For example, the computing device can be a personal computing device, such as a mobile computing device (or portable electronic device), that is capable of operating application programs. One example of such a mobile computing device is a smart phone. Another example of such a mobile computing device is a tablet computer or notebook computer.

The application mode process 200 can determine 202 If the computing device is in a gaming authorized location. The gaming authorized location has a geographic significance. For example, the gaming authorized location can be a state wide location, an establishment wide location, or an internal area within an establishment. A decision 204 can evaluate whether the computing device is in a gaming authorized location. When the decision 204 determines that the computing device is in a gaming authorized location, the computing device can operate 206 the application program in a gaming mode. For example, when the application is operated in a gaming mode, the application program can operate to provide a game of chance for a user of the computing device and/or provide an ability to place a bet (e.g., sports betting) via the computing device.

On the other hand, when the decision 204 determines that the computing device is not in a gaming authorized location, the application program can operate 208 in a non-gaming mode. In the non-gaming mode, the application program does not permit operating of a game of chance or placing of a bet. However, in one embodiment, the application program can offer a non-gaming alternative, which can enable the user to still interact with the application program. In one embodiment, the operation of the application program in the non-gaming mode can allow the user to win or accrue awards, assets, tools, features or benefits that are usable or convertible either for use with the application program when operating in the gaming mode or for use with another device (e.g., stationary gaming machine).

In another embodiment, the user can play along by executing the application as intended, but without actually placing a monetary bet (e.g., simulation mode). The user can practice to gain experience on a game, to test his skills, to gain familiarity with a new game, etc. For example, a user in a non-gaming location can monitor a live video broadcast of a game of Craps taking place at the gaming location. The user can join in and bet with virtual chips in a simulated game and see the real result of his virtual wager in the context of the real, live game. Thus, the user stays engaged by learn to play without risking money. The user can be at or distant from the gaming location.

Following the blocks 206 or 208, a decision 210 can determine whether the application program should end. When the decision 210 determines that the application program should not end, the application process 200 can return to repeat the block 202 and subsequent blocks so that the operation of the application program can dynamically alter its operation, such as switching between the gaming mode and the non-gaming mode, based on the location of the computing device. In some embodiments, switching from gaming mode to non-gaming mode (e.g., switch to play-along or free-play mode) maybe allowed even when the user is at an authorized gaming location so that the user can practice without risking money until she is ready. Mode switching can be automatically performed without user participation, or can switch only on user request or authorization. Alternatively, when the decision 210 determines that the application mode process 200 should end, the application mode process 200 can end.

Figure 2B:
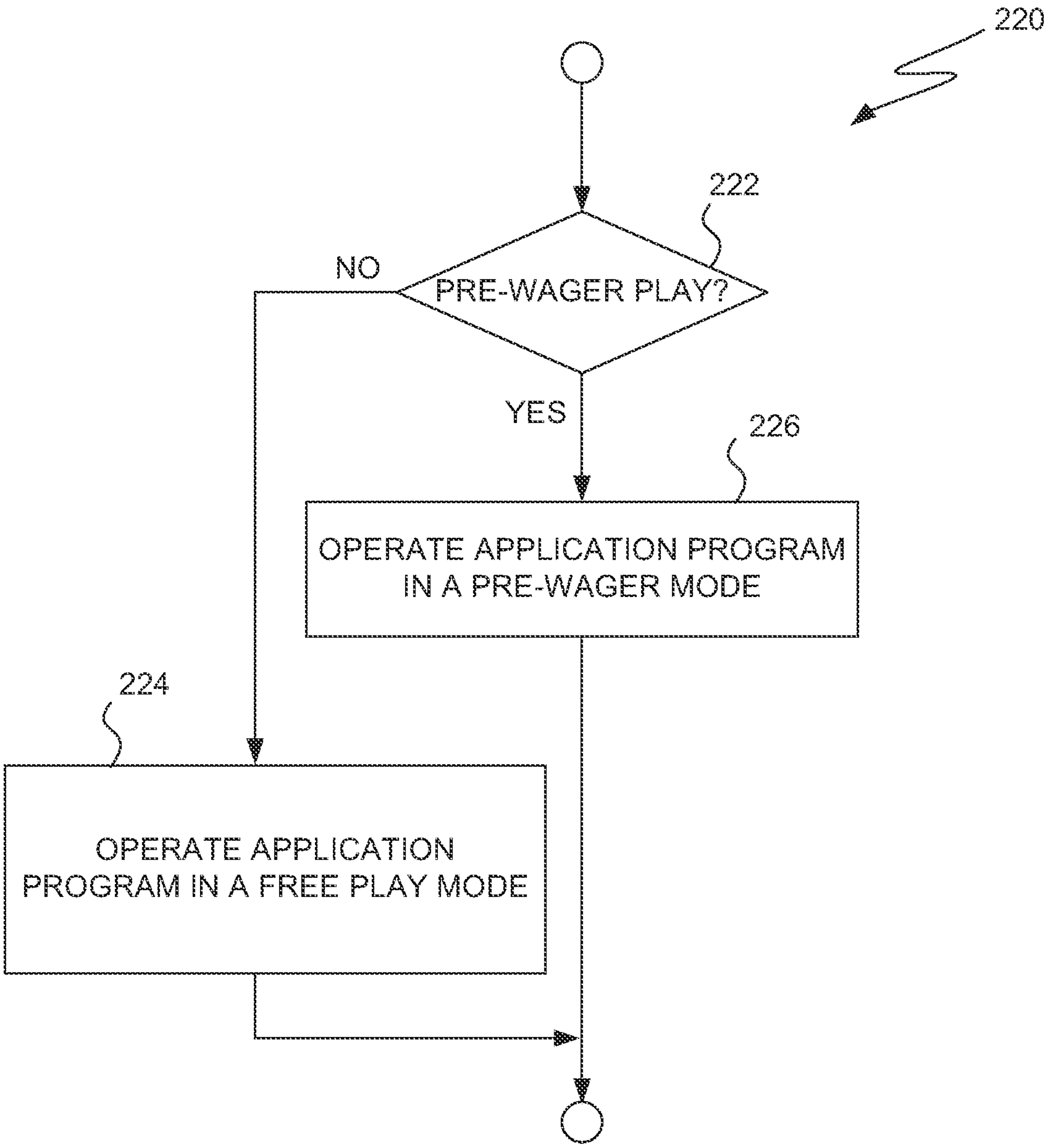
FIG. 2B is a flow diagram of a pre-wager mode process according to one embodiment.

FIG. 2B is a flow diagram of a pre-wager mode process 220 according to one embodiment. The pre-wager mode process 220 can be performed when the application program operates in a non-gaming mode, such as within block 208 of FIG. 2A. In the pre-wager mode process 220, a decision 222 can determine whether pre-wager play is being requested.

When the decision 222 determines that pre-wager play is not requested, the application program can be operated 224 in a free play mode. In the free play mode, the user can operate the application program without any wagering or cost to the player. Free play mode can be applied to any casino game. A special case of free play is the play along mode where a user at a non-gaming location plays along with a live game (e.g., Roulette) at a gaming-authorized location as if he was there, although no monetary betting takes place. On the other hand, when the decision 222 determines that the pre-wager play has been requested, the application program can operate 226 in a pre-wager mode. In the pre-wager mode, the application program allows a user to configure a wager that may be activated in the future. In other words, the user can schedule a wager to occur in the future. Following the blocks 224 or 226, the pre-wager mode process 220 can, for example, return to block 208 (or decision 210) of the application mode process 200 illustrated in FIG. 2A.

Figure 2C:
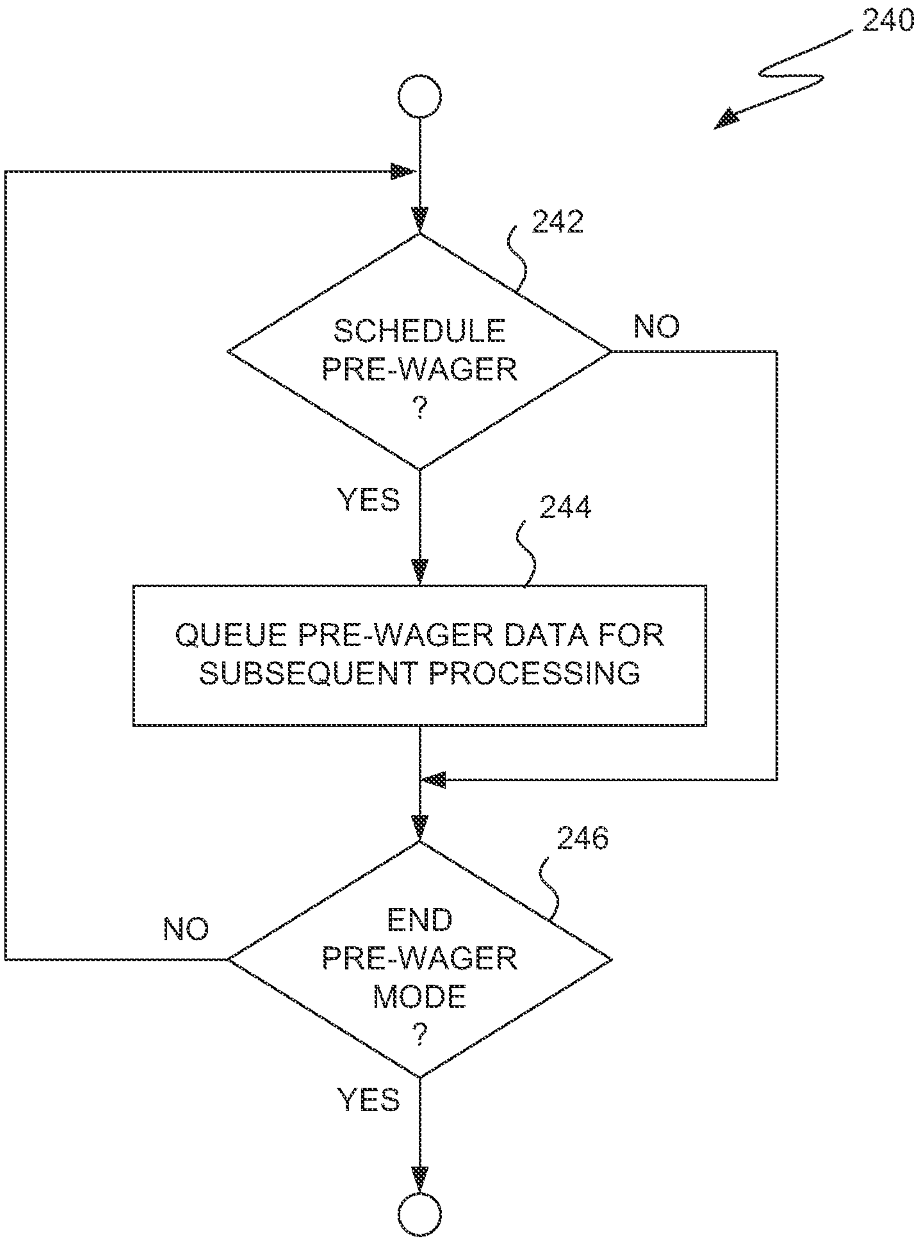
FIG. 2C is a flow diagram of a pre-wager scheduling process according to one embodiment.

FIG. 2C is a flow diagram of a pre-wager scheduling process 240 according to one embodiment. The pre-wager scheduling process 240 can be performed when the application program operates in the pre-wager mode, such as associated with the block 226 illustrated in FIG. 2B. According to the pre-wager scheduling process 240, a decision 242 can determine whether a pre-wager is to be scheduled. When the decision 242 determines that a pre-wager is to be scheduled, pre-wager data can be queued 244 for subsequent processing. Next, a decision 246 can determine whether the pre-wager mode is to end. When the decision 246 determines that the pre-wager mode is not to end, the pre-wager scheduling process 240 returns to repeat the decision 242 and subsequent blocks. On the other hand, when the decision 246 determines that the pre-wager mode is to end, the pre-wager scheduling process 240 can and processing can, for example, return to the block 208 (or the decision 210) of the application mode process 200 illustrated in FIG. 2A. Additionally, it should be noted that when the decision 242 determines that a pre-wager is not to be scheduled, the block 244 can be bypassed.

Figure 3:
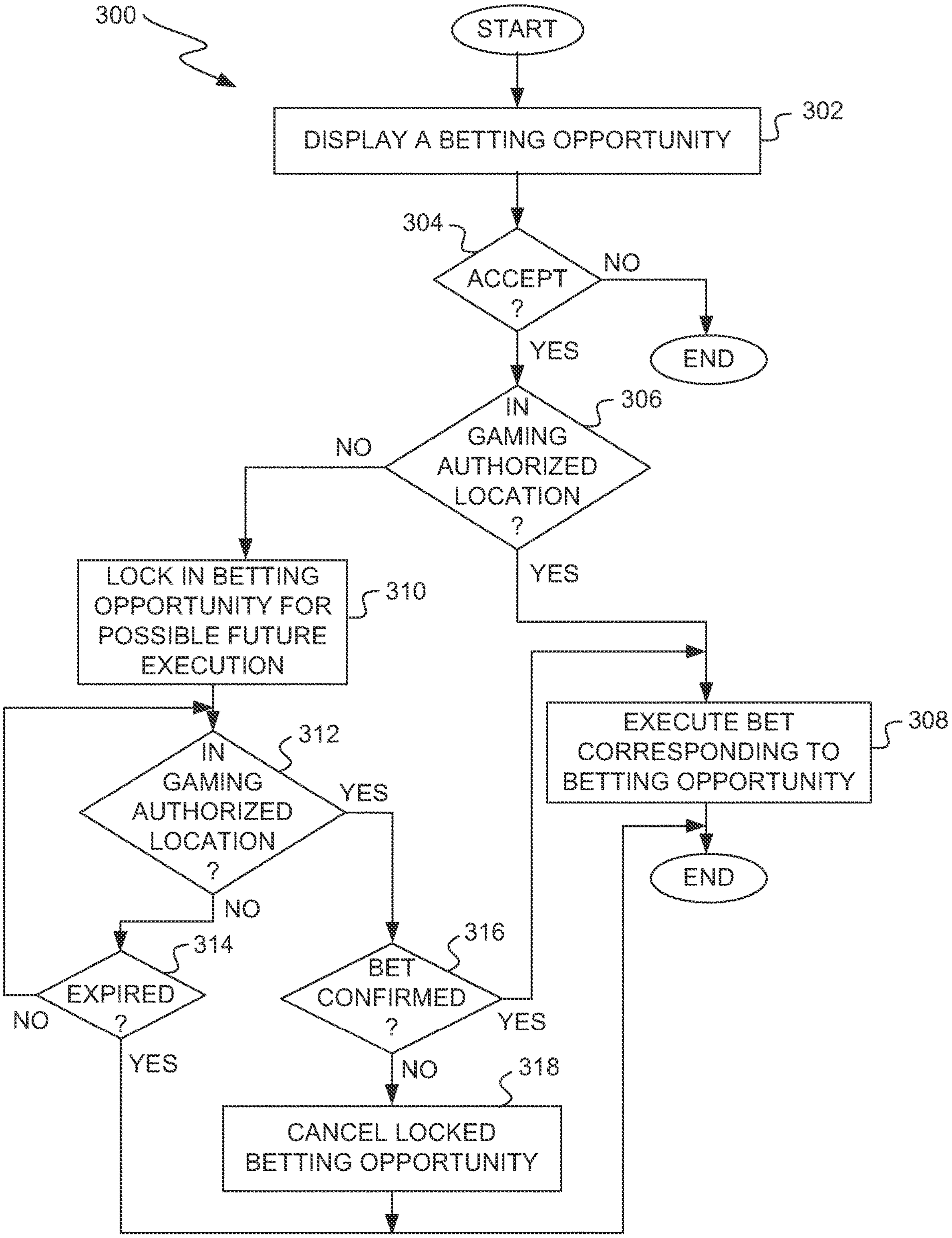
FIG. 3 is a flow diagram of a location-based betting process according to one embodiment.

FIG. 3 is a flow diagram of a location-based betting process 300 according to one embodiment. The location-based betting process 300 can facilitate initiation of bets using a portable electronic device, even if the portable electronic device is in a location where gaming is not authorized.

The location-based betting process 300 illustrated in FIG. 3 can display 302 a betting opportunity. Here, the betting opportunity can be displayed on a display associated with the portable electronic device. The betting opportunity can be provided to the portable electronic device from a server computer (e.g., gaming/betting server machine). The portable electronic device can operate an application program that can receive and display information on the betting opportunity.

Next, a decision 304 can determine whether the betting opportunity has been accepted. Here, a user of the portable electronic device can review the betting opportunity being displayed 302 and decide whether to accept or decline the betting opportunity. When the decision 304 determines that the betting opportunity has not been accepted (i.e., declined), the location-based betting process 300 can end.

Alternatively, when the decision 304 determines that the betting opportunity has been accepted, a decision 306 can determine whether the portable electronic device is in a gaming authorized location. When the decision 306 determines that the portable electronic device is in a gaming authorized location, the bet corresponding to the betting opportunity can be executed 308. Here, a user of the portable electronic device can accept the betting opportunity so long as the portable electronic device is in a gaming authorized location. The betting opportunity being accepted can be selected, customized or altered in view of desires of the user. In any case, after a bet corresponding to the betting opportunity has been executed 308 for the user, the location-based betting process 300 can end.

On the other hand, when the decision 306 determines that the portable electronic device is not in a gaming authorized location, a bet corresponding to the betting opportunity is not permitted to be executed. However, in this situation, the betting opportunity can be locked in 310 for possible future execution. By locking in 310 the betting opportunity, the user of the portable electronic device can effectively secure the betting opportunity for future execution so long as the portable electronic device reaches a gaming authorized location in a timely manner. In this case, the user secured the right to place the bet at a future time. The bet option must be exercised prior to execution of the game or prior to the presentation of the game result. Otherwise, the bet option expires and becomes worthless. In one example, a user may secure an option to place a $100 bet, at a given odd and pay out schedule. The bet can be premised on any of a variety of betting opportunities. As one example, the bet might be premised on the San Francisco 49ers winning the Super Bowl. As another example, the bet might be premised on the National Lottery's grand prize not having a winner over the next two drawings. If the bet option isn't exercised (e.g., by placing the actual bet at an authorized location) before the cut-off deadline (e.g., before the start of the game, before the next two drawings, etc.), the bet option expires.

The location-based betting process 300 can further include a decision 312 that determines whether the portable electronic device is in a gaming authorized location. When the decision 312 determines that the portable electronic device is not in a gaming authorized location, a decision 314 can determine whether the locked betting opportunity has expired. Typically, after the betting opportunity is locked in 310, the locking thereof can have a time limit (e.g., predetermined expiration or predetermined duration) after which the locked betting opportunity expires. Hence, when the decision 314 determines that the locked betting opportunity has not expired, the location-based betting process 300 can return to repeat the decision 312 so that the location monitoring can continue. In this example, the location monitoring can be dynamically performed by the portable electronic device without the request for assistance of the user. However, in an alternative embodiment, it should be understood that the portable electronic device could check its location on request from the user of the portable electronic device. In the case where the decision 314 determines that the locked betting opportunity has expired, the location-based betting process 300 can end.

Alternatively, when the decision 312 determines that the portable electronic device is in a gaming authorized location, a decision 316 can determine whether the bet associated with the locked betting opportunity is confirmed. Here, the location-based betting process 300 can allow the user of the portable electronic device to confirm that the bet corresponding to the locked betting opportunity is still to be made. When the decision 316 determines that the bet has been confirmed, the location-based betting process 300 can proceed to the block 308 where a bet corresponding to the locked betting opportunity can be executed. On the other hand, when the decision 316 determines that the user has not confirmed (i.e., declined) the bet corresponding to the locked betting opportunity, the locked betting opportunity can be canceled 318. After the locked betting opportunity has been canceled 318, the location-based betting process 300 can end.

The scope or size of a gaming authorized location can vary depending on implementation. In one implementation, the gaming authorized location can be associated with an area or zone established by a wireless network. In another implementation, the gaming authorized location can be established by a registration site, which can established physical presence or close proximity of the portable gaming device. In still another implementation, the gaming authorized location can be established by both a wireless network and/or a registration site. The gaming authorized location can be implemented by or proximate to a kiosk, a bank of gaming machines (e.g., bank of slot machines or video gaming machines), a table game, a room, or an area (e.g., stadium, casino floor, convention center).

There are various approaches for determining whether a portable electronic device (e.g., PED) is in a gaming authorized location. Any one or more of these techniques can be used for the block 204 of FIG. 2A or the blocks 306 or 312 of FIG. 3.

The location of a portable electronic device can be determined by various techniques. In one embodiment, the detection of a mobile electronic device within a gaming authorized location can be achieved using the wireless technologies (e.g., wireless geofencing). For example, relatively short range wireless technologies such as Bluetooth, near field communications (NFC), or radio frequency identification (RFID) can be used to evaluate whether the portable electronic device is within a gaming authorized location. As an example, placing one or more device registration sites within a gaming authorized location, such as an authorized gaming zone, can be used to determine the location of portable electronic devices. In one embodiment, in order to be recognized as within a gaming authorized location, the portable electronic device must be within wireless range of a wireless source provided by the device registration sites within the gaming authorized location. In one implementation, the wireless technologies being used for this purpose can be provided for this specific purpose of establishing a gaming authorized location. In another implementation, the wireless technologies can be generally provided within an establishment or larger area but can also be used to establish the position of the mobile electronic device (i.e., whether within the gaming authorized location). Examples of wireless technologies for mobile device locationing in larger areas include Wi-Fi, WiMax, LTE, Cellular, and the like. Satellite-based location technology such as GPS can also be used. In one approach, some combinations of these wireless technologies are used at the same time, depending on which signal is available, to increase the accuracy of the locationing technique.

In another embodiment, the detection of a mobile electronic device within a gaming authorized location can be achieved using a physical event between the mobile electronic device and device registration sites within a gaming authorized location. For example, the mobile electronic device associated with the user that is desirous of participating in games of chance, or otherwise wagering, can physically contact their mobile electronic device to a device registration site within a gaming authorized location. This can establish a pairing or registration of the mobile electronic device, if desired, and can confirm its presence within the gaming authorized location. The physical contact can establish physical presence. For example, the physical contact can be achieved using a registration site that can receive a "bump" from a portable electronic device. Additional details on a "bump" event and its processing can be found in (i) U.S. patent application Ser. No. 13/622,702, filed Sep. 19, 2012 and entitled "Multi-Functional Peripheral Device," which is hereby incorporated herein by reference; and (ii) U.S. patent application Ser. No. 12/945,888, filed Nov. 14, 2010 and entitled "Multi-Functional Peripheral Device," which is hereby incorporated herein by reference. As an alternative, the device registration site can also be implemented as a docking station. In such an implementation, a mobile gaming device can dock itself into the docking station to provide a pairing or registration and/or to confirm its presence.

As previously noted, the location of a portable electronic device can be determined by various techniques. Additionally, in some embodiments, it may be advantageous to make use of a plurality of different techniques to establish and/or maintain knowledge of the location of a portable electronic device. The advantages offered by using multiple techniques can include redundancy, enhanced reliability and improved security. In one implementation, a localized location detection technique, whether dedicated or not, could be utilized to establish initial authorized location of a portable electronic device. Then, for subsequent location monitoring, a wider location detection technique could be utilized to monitor the location of the portable electronic device. One example of this combine technique could be to use a short range wireless technique (e.g., Bluetooth, RFID, NFC) initially, followed by a midrange wireless technique (e.g., Wi-Fi, WiMax, LTE).

Further still, in other embodiments, it may be useful to utilize one wireless technique for location monitoring, and a separate wireless technique for wireless communication. For example, the location monitoring could utilize a localized wireless technique (e.g., Bluetooth) but for data communication a more pervasive network, such as Wi-Fi or cellular networks, could utilized.

In some embodiments, it may be required or useful to subsequently re-determine whether a portable electronic device (e.g., PED) is in a gaming authorized location. For example, if the block 204 determines that the computing device (i.e., portable electronic device) is in a gaming authorized location, then at block 206, the application program can operate 206 in a gaming mode. The ability of the application program to operate 206 in a gaming mode can be controlled at (i) the device or application level, (ii) the server level which provides or supports the gaming via the application program, or (iii) a combination thereof. After the gaming mode of the application program is made available on the computing device, it may be required or useful to determine whether the computing device is still within the gaming authorized location. Any one or more of the above-noted techniques for determining whether the computing device is within a gaming authorized location can be used for such re-determining. It should also be understood that the frequency or rate of re-determining can vary with implementation. As one example, the re-determining can be done on a periodic basis. As another example, the re-determining can be performed when a gaming action is requested.

In one embodiment, a remote server can be utilized to store information on whether portable electronic devices are in gaming authorized locations. That is, with the assistance of other computing devices, a remote server (that is, a server machine) can manage the storage of such gaming authorization data in a database that is maintained and frequently updated. As a result, when a determination is needed to evaluate whether a particular portable electronic device is within a gaming authorized location, the remote server can itself or on request query the database and rapidly determine whether the particular portable electronic device is within a gaming authorized location.

Figure 4A:
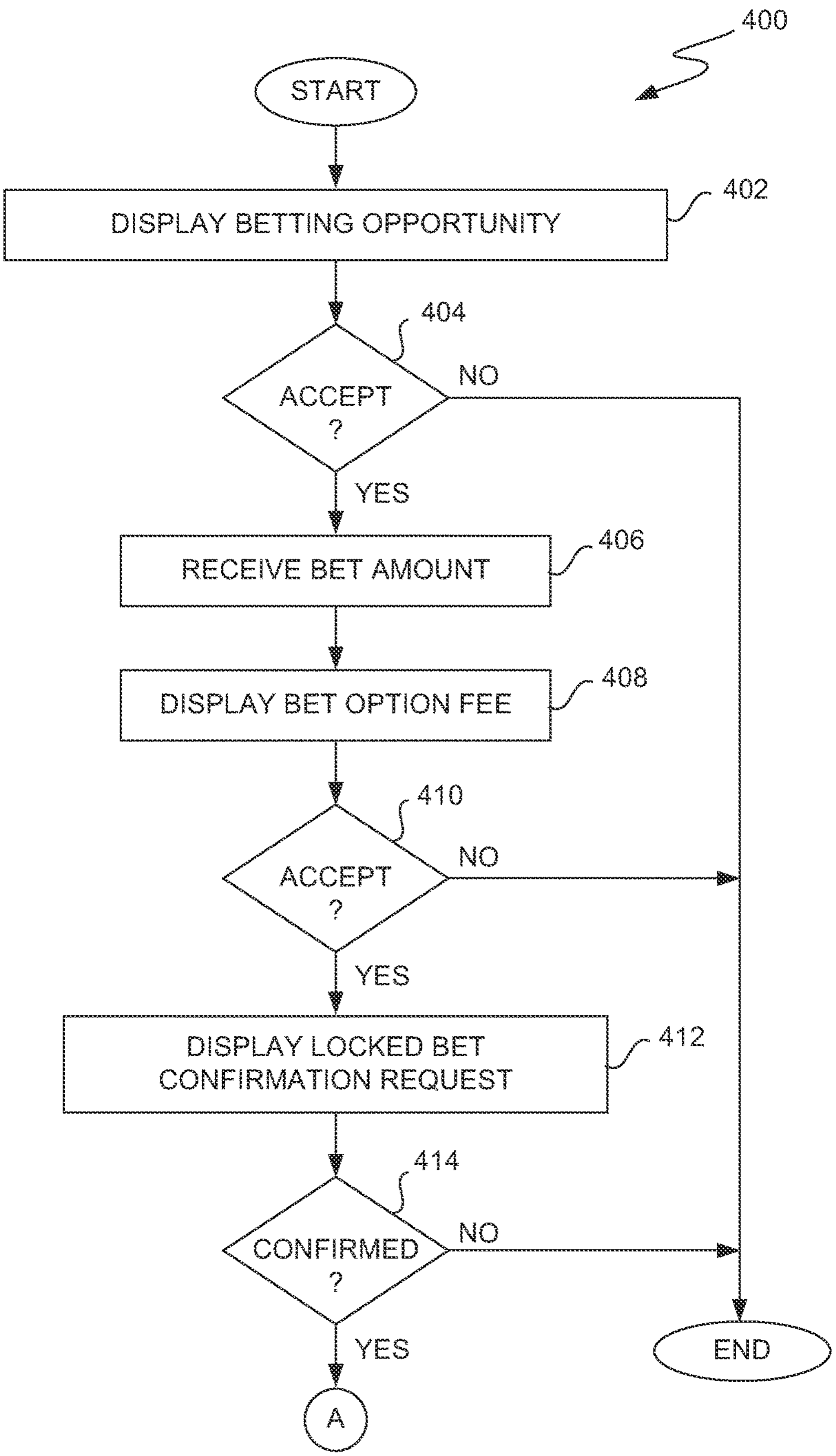
FIGS. 4A and 4B illustrate a flow diagram of a bet locking process according to one embodiment.
Figure 4B:
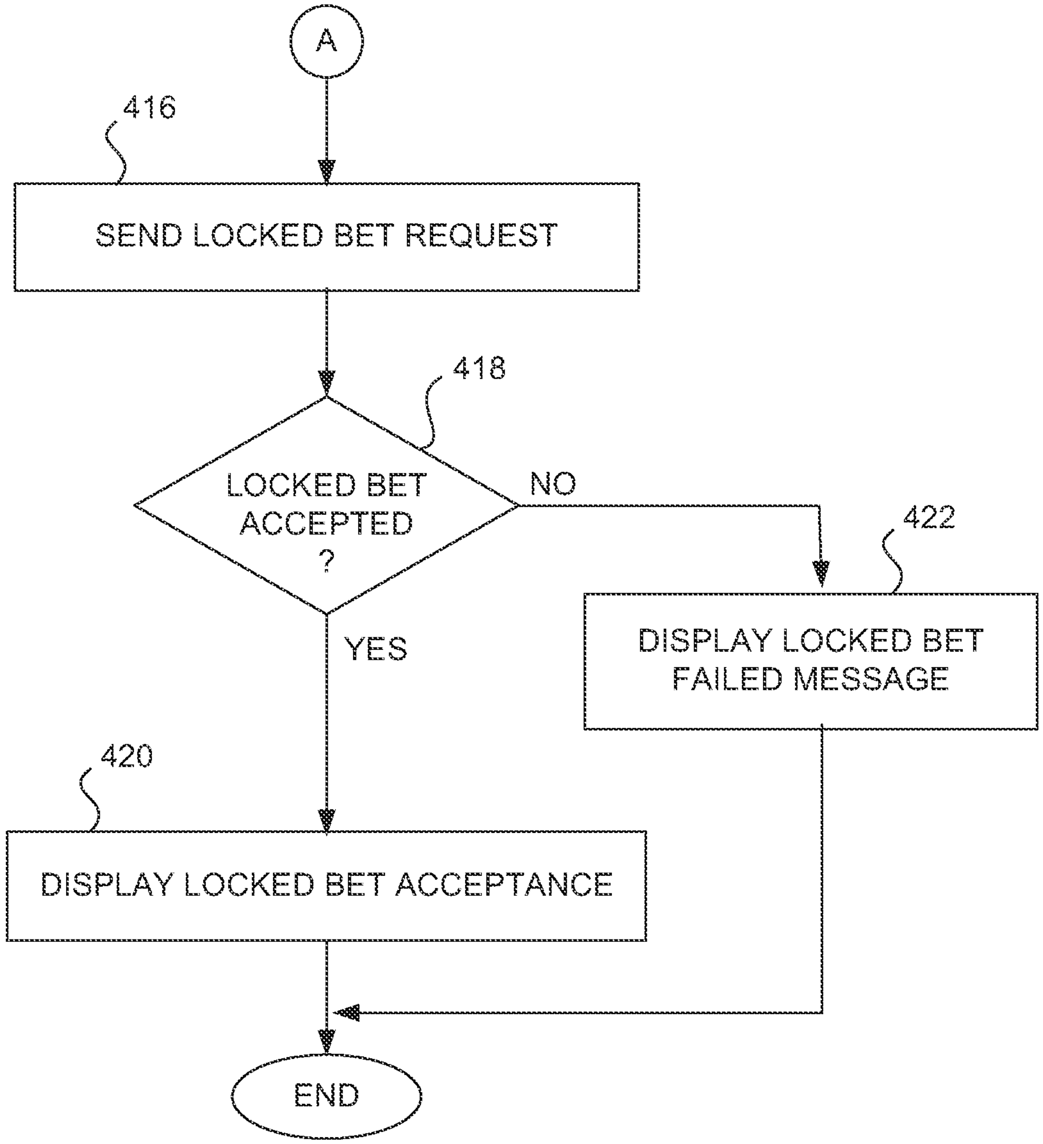

FIGS. 4A and 4B illustrate a flow diagram of a bet locking process 400 according to one embodiment. The bet locking process 400 can be performed by a computing device. The computing device can be a personal computing device, such as a mobile computing device (or portable electronic device).

The bet locking process 400 can display 402 a betting opportunity. Typically, the betting opportunity can be displayed 402 on a display associated with a mobile computing device used by a user. A decision 404 can then determine whether the user has accepted the betting opportunity. Typically, a user can interact with the mobile computing device to indicate their acceptance of the betting opportunity. Alternatively, the user can elect to decline the betting opportunity. If the user has elected to decline the betting opportunity, the bet locking process 400 can end.

However, if the user has elected to accept the betting opportunity, following the decision 404, the bet locking process 400 continues to process the betting opportunity. In this regard, a bet amount can be received 406. For example, the user can interact with the mobile computing device to enter or select a bet amount. Next, a bet option fee can be displayed 408. The bet option fee (or bet lock fee) can represent a fee or charge that is associated with the locking of the betting opportunity. The locked bet opportunity can also be referred to as an option to later activate a bet. In an alternative embodiment, the bet option fee maybe collected without the bet amount received in 406. In this case, the user purchased the right to place the bet later. The bet option must be exercised prior to execution of the game or prior to the presentation of the game result. Otherwise, the bet option expires and becomes worthless. In one example, a user may buy an option to place a $100 bet, at a given odd and pay out schedule. The bet can be premised on any of a variety of betting opportunities. As one example, the bet might be premised on the San Francisco 49ers winning the Super Bowl. As another example, the bet might be premised on the National Lottery's grand prize not having a winner over the next two drawings. If the bet option isn't exercised (e.g., by placing the actual bet at an authorized location) before the cut-off deadline (e.g., before the start of the game, before the next two drawings, etc.), the bet option expires. The bet option fee can be displayed on a display associated with the mobile computing device. A decision 410 can then determine whether the user has accepted the bet option fee. For example, the user can interact with the mobile computing device to indicate their acceptance of the bet option fee. When the decision 410 determines that the user has not accepted, but declined, the bet option fee, the bet locking process 400 can end.

On the other hand, when the decision 410 determines that the user has accepted the bet option fee, a locked bet confirmation request can be displayed 412. The locked bet confirmation request presents information concerning the betting opportunity to be locked. The information concerning the betting opportunity to be locked can be displayed 412 on a display associated with the mobile computing device. The user of the mobile computing device can then evaluate whether the information is correct and whether they want to confirm the locking of the betting opportunity. Next, a decision 414 can determine whether the locked betting opportunity has been confirmed. When the locked betting opportunity has not been confirmed, but denied, the debt locking process 400 can end. Alternatively, when the decision 414 determines that the locked betting opportunity has been confirmed, a locked bet request can be sent 416. Here, the locked bet request can be sent 416, for example, to a remote server computer (e.g., gaming/betting server machine(s) 102) for processing of the locked bet request.

A decision 418 can then determine whether the locked bet has been accepted. Here, in response to the locked bet request, the locked bet being requested can be accepted or decline by a remote processing system, which can operate on the remote server computer. When the decision 418 determines that the locked bet request has been accepted, a locked bet acceptance can be displayed 420. For example, the locked bet acceptance can provide confirmation information that the locked bet being requested has been accepted. The locked bet confirmation can be displayed 420 on a display associated with the mobile computing device.

Alternatively, when the decision 418 determines that the locked bet request has not been accepted, but declined, a locked bet failed message can be displayed 422. For example, the locked bet failed message can be displayed 422 on a display associated with the mobile computing device. For example, the locked bet failed message, might indicate failure due to insufficient funds. Following the blocks 420 and 422, the bet locking process 400 can end.

In one embodiment, a database can be used by a server computer to manage availability, acceptance and execution of betting opportunities.

According to another embodiment, an application program in operation, such as on a PED, can provide gaming assets or awards. When transitioning the application program between a gaming authorized mode and a gaming unauthorized mode, such assets or awards can be converted. For example, the conversion can be from currency (e.g., points) to another currency (e.g., cash), or can be converted to functionally-different assets or awards (e.g., game tools, virtual goods) or value-equivalent digital goods (e.g., 2X multiplier bonus for all payouts in the next 10 spins of a slot game, virtual chips).

According to another embodiment, an application program in operation, such as on a PED, can provide games symbols that dynamically change. This creates continuity, as well as progress, that links on-site (authorized gaming location) and off-site (unauthorized gaming location) user experiences. For example, gaming symbols can dynamically change over time, due to game play, due to events, due to location, due to user satisfying participation criteria, etc. For example, a gaming symbol (such as for an award) can initially be an apple seed. Then through continued game play or play time, the apple seed can grow into a tree, and then eventually produce one or more apples. The apples can then be redeemed for benefits which can vary. For example, an apple could be redeemed for a free spin or enhancement (e.g., 2× multiplier) on a game of chance (e.g., slot machine or table wagering game), or for a discounted admission ticket, free extra bonus spin or hotel room upgrade. In one scenario, apple seeds can be acquired at a gaming establishment, which can distribute the apple seeds based on user performance play, random or even virally distributed. Once a user has a seed, the development of the apple tree and the yielding of apples can be facilitated through user actions (e.g., via PED), either at a gaming establishment or while not at a gaming establishment, such as well as at home.

Although betting/wagering can pertain to sports betting, there are various other games that can also offer a betting or wagering opportunity. For example, Keno is a game of change that can involve betting/wagering. For example, an application program can allow users to play a Keno game for "free", but when in a gaming authorized zone, the application program can allow users to play a game of Keno for money. The application program can transform to or from a game mode automatically or only after user permission.

In one embodiment, pre-play can be performed in advance of reaching a gaming authorized area. For example, with pre-play a user can interact with an application program operating on a portable gaming device to schedule (e.g., queue) a bet or wager regardless of their location, and then when the user (and the portable electronic device) reach a gaming authorized area, the application program can initiate auto-play of the scheduled gaming actions. That is, a Bingo player can pre-configure her Bingo card with her "lucky" numbers at home, or a Keno player can preset several lucky number sets (groups of 6 numbers, groups of 7 numbers, etc.) to be activated when the player is at an authorized location for betting, and the like.

In another embodiment, pre-play can be implemented as pre-play lottery using an application to pre-order one or more lottery tickets. The application program can record your request [e.g., specific type, quantity, numbers, etc.]. Later, when the application program is in an "authorization" location (e.g., at an authorized gas station or store) to buy the lottery tickets, the application can initiate the buying of the pre-ordered lottery tickets. The tickets can be e-purchased at an authorized location directly with the application program. Alternatively, the application program can communicate with a point of sale (POS) terminal at the authorized location to make the purchase.

In one embodiment, the application program can also monitor wins and notify the user via the application program, email message or text. The application program can also can keep track of usage history, play and/or performance.

Figure 5:
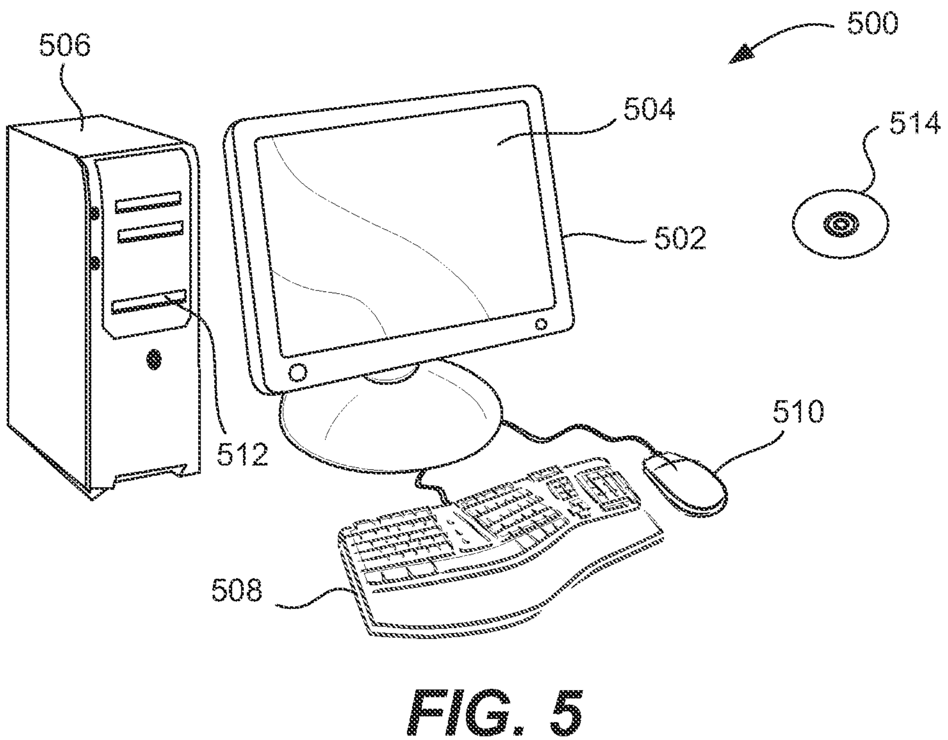
FIG. 5 illustrates an exemplary computer device suitable for use with at least one embodiment of the invention.

FIG. 5 illustrates an exemplary computer device 500 suitable for use with at least one embodiment of the invention. The methods, processes and/or graphical user interfaces discussed above can be provided by a computer device. Although the computing device 500 is depicted as a desktop computer, the computer device 500 can represent computing device of different form factors, such as a server machine or a portable electronic device. The computer device 500 can includes a display monitor 502 having a single or multi-screen display 504 (or multiple displays), a housing 506, a keyboard 508, and a mouse 510. The mouse 510 is representative of one type of pointing device. The housing 506 can house a processing unit (or processor), system memory and a hard drive (not shown). The housing 506 can also house a drive 512, such as a DVD, CD-ROM or floppy drive. The drive 512 can also be a removable hard drive, a Flash or EEPROM device, etc. Regardless, the drive 512 may be utilized to store and retrieve software programs incorporating computer code that implements some or all aspects of the invention, data for use with the invention, and the like. Although CD-ROM 514 is shown as an exemplary computer readable storage medium, other computer readable storage media including floppy disk, tape, Flash or EEPROM memory, memory card, system memory, and hard drive may be utilized. In one implementation, a software program for the computer system 500 is provided in the system memory, the hard drive, the drive 512, the CD-ROM 514 or other computer readable storage medium and serves to incorporate the computer code that implements some or all aspects of the invention.

Figure 6:
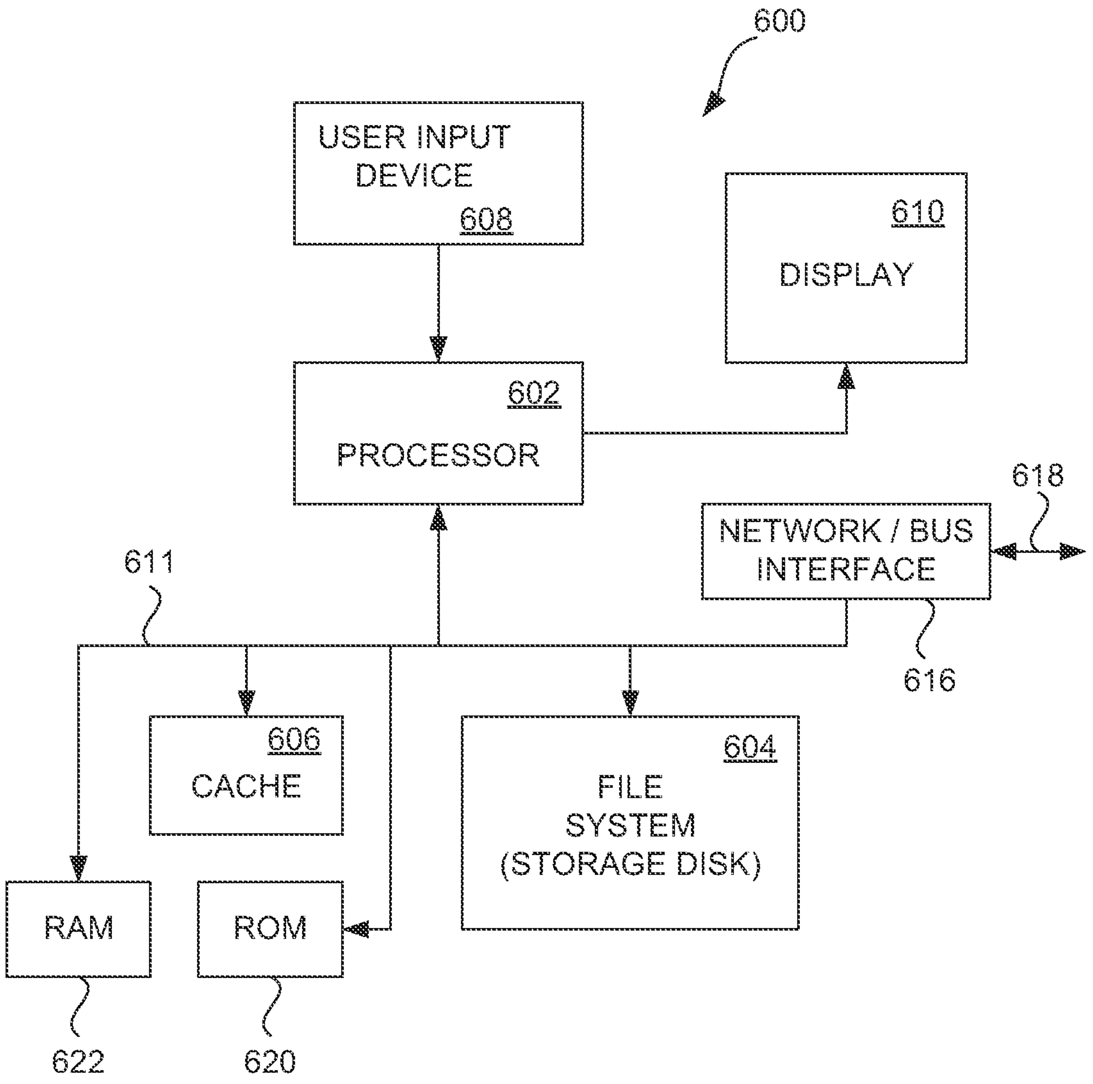
FIG. 6 is a block diagram of an example computing device.

FIG. 6 is a block diagram of an example computing device 600. The computing device 600 can be the gaming/betting server machine(s) 112 or portable electronic devices 106-112 illustrated in FIG. 1, or any other server or computing device used to carry out the various embodiments disclosed herein. The computing device 600 can include a processor 602 that pertains to a microprocessor or controller for controlling the overall operation of the computing device 600. The computing device 600 can store any type of data and information as discussed above in a file system 604 and a cache 606. The file system 604 is, typically, a storage disk or a plurality of disks, and/or solid-state Flash drive. The file system 604 typically provides high capacity storage capability for the computing device 600. However, since the access time to the file system 604 is relatively slow, the computing device 600 can also include a cache 606. The cache 606 is, for example, Random-Access Memory (RAM) provided by semiconductor memory. The relative access time to the cache 606 is substantially shorter than for the file system 604. However, the cache 606 does not have the large storage capacity of the file system 604. Further, the file system 604, when active, consumes more power than does the cache 606. The computing device 600 also includes a RAM 620 and a Read-Only Memory (ROM) 622. The ROM 622 can store programs, utilities or processes to be executed in a non-volatile manner. The RAM 620 provides volatile data storage, such as for the cache 606.

The computing system 600 also includes a user input device 608 that allows a user of the computing system 600 to interact with the computing system 600. For example, the user input device 608 can take a variety of forms, such as a button, keypad, touch screen, dial, and the like. Still further, the computing system 600 includes a display 610 (screen display) that can be controlled by the processor 602 to display information to the user. A data bus 611 can facilitate data transfer between at least the file system 604, the cache 606, the processor 602, and the CODEC 612.

The computing system 600 can also include a network/bus interface 616 that couples to a data link 618. The data link 618 allows the computing system 600 to couple to a host computer or data network, such as the Internet. The data link 618 can be provided over a wired connection or a wireless connection. In the case of a wireless connection, the network/bus interface 616 can include a wireless transceiver.

Additional details on social gaming and the like are provided in U.S. patent application Ser. No. 13/296,182, filed Nov. 14, 2011 and entitled "Social Gaming," which is hereby incorporated herein by reference in its entirety for all purposes.

Additional details on viral events and distribution and the like are provided in U.S. patent application Ser. No. 12/617,717, filed Nov. 12, 2009 and entitled "Gaming System Including A Viral Event," which is hereby incorporated herein by reference in its entirety for all purposes.

The various aspects, features, embodiments or implementations of the invention described above can be used alone or in various combinations.

Embodiments of the invention can, for example, be implemented by software, hardware, or a combination of hardware and software. Embodiments of the invention can also be embodied as computer readable code on a computer readable medium. In one embodiment, the computer readable medium is non-transitory. The computer readable medium is any data storage device that can store data which can thereafter be read by a computer system. Examples of the computer readable medium generally include read-only memory and random-access memory. More specific examples of computer readable medium are tangible and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

Numerous specific details are set forth in order to provide a thorough understanding of the present invention. However, it will become obvious to those skilled in the art that the invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

In the foregoing description, reference to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

The invention claimed is:

1. A computer-implemented method for facilitating deferred betting on a portable electronic device, comprising:

causing presentment of a betting opportunity via a graphical user interface associated with the portable electronic device at a first location, the betting opportunity pertaining to a betting activity at a second location corresponding to a betting authorized location;

receiving an input via the graphical user interface indicating a desire to participate in the betting activity;

facilitating participation in the betting activity for at least one player account associated with the portable electronic device while located in the first location;

placing a bet corresponding to the betting activity for the at least one player account associated with the portable electronic device in a play-along mode, thereby allowing the at least one player account to play along with the betting activity and to receive one or more rewards or advantages associated with the betting activity;

determining that the portable electronic device moved from the first location to the second location; and operating the portable electronic device in a wagering mode.

2. The method as recited in claim 1, wherein the one or more rewards or advantages for the at least one player account is a virtual reward or advantage in the play-along mode.

3. The method as recited in claim 2, wherein the one or more rewards or advantages is based on virtual currency or virtual chips.

4. The method as recited in claim 1, wherein the one or more rewards or advantages is non-monetary.

5. The method as recited in claim 1, wherein the one or more rewards or advantages is non-numerical.

6. The method as recited in claim 1, wherein the second location is a casino.

7. The method as recited in claim 6, wherein the one or more rewards or advantages comprise a guide to a gaming machine within the casino.

8. The method as recited in claim 1, wherein the betting activity is a casino table game.

9. The method as recited in claim 1, further comprising converting at least one of the one or more rewards or advantages that the at least one player account previously earned from its play when the portable electronic device is operating in the play-along mode to a game play asset that is able to be used in play with the betting activity when the portable electronic device is operating in the wagering mode.

10. The method as recited in claim 9, wherein the converting is automatically performed when the determining determines the portable electronic device is at the second location.

11. The method as recited in claim 9, further comprising:

determining that the first location corresponds to a betting unauthorized location;

determining that the portable electronic device moved from the second location to the first location; and subsequently operating the portable electronic device in the play-along mode.

12. The method as recited in claim 11, further comprising converting the game play asset to a virtual reward or advantage when the portable electronic device is operating in the play-along mode.

13. The method as recited in claim 12, wherein the converting is automatically performed when the determining determines the portable electronic device moves from the second location to the first location.

14. The method as recited in claim 1, wherein the betting opportunity pertains to sports betting.

15. An electronic gaming system for facilitating deferred betting comprising:

a game management system comprising a processor and memory, the memory storing program code including instructions, the game management system executing the instructions which cause the game management system to, at least:

cause presentment of a betting opportunity via a user interface associated with a portable electronic device at a betting unauthorized location, the betting opportunity pertaining to a betting activity at a betting authorized location;

receive instructions indicating a desire to participate in the betting activity based on an input via the user interface;

facilitate participation in the betting activity for at least one player account associated with the portable electronic device;

place a bet corresponding to the betting activity for the at least one player account associated with the portable electronic device in a play-along mode based on the instructions, thereby allowing the at least one player account to play along with the betting activity and to receive rewards or advantages associated with the betting activity;

earn a reward or advantage for the at least one player account from its play of a software program when the portable electronic device is operating in the play-along mode;

determine that the portable electronic device has moved from the betting authorized location to the betting unauthorized location;

operate the portable electronic device in the play-along mode in the betting unauthorized location; and convert the game play asset to a virtual reward or advantage when the portable electronic device is operating in the play-along mode.

16. The electronic gaming system as recited in claim 15, wherein the game management system is further operable to execute instructions which cause the game management system to:

determine that the portable electronic device is at the betting authorized location;

operate the portable electronic device in a wagering mode at the betting authorized location;

present a plurality of conversion options to the portable electronic device for the reward or advantage previously earned from play of the software program in the play-along mode;

receive a selection of at least one of the conversion options based on an input via the user interface; and convert, based on the selected at least one of the conversion options, the reward or advantage previously earned from its play of the software program in the play-along mode to a game play asset or enhancement that is able to be used in play of the software program in the wagering mode.

17. A non-transitory computer readable medium including at least computer program code for an software program stored thereon, the software program being executable by a computing device, comprising:

computer program code for operating the software program to cause presentment of a betting opportunity via a graphical user interface associated with a portable electronic device at a first location, the betting opportunity pertaining to a betting activity at a second location corresponding to a betting authorized location;

computer program code for receiving information indicating a desire to participate in the betting activity based on an input via the graphical user interface;

computer program code for facilitating participation in the betting activity for at least one player account associated with the portable electronic device while located in the first location based on the information;

computer program code for placing a bet corresponding to the betting activity for the at least one player account associated with the portable electronic device in a play-along mode, thereby allowing the at least one player account to play along with the betting activity in the second location;

computer program code for earning a reward or advantage for the at least one player account from its play of the software program when the portable electronic device is operating in the play-along mode;

computer program code for determining that the portable electronic device moved from the first location to the second location; and operating the portable electronic device in a wagering mode.

18. The non-transitory computer readable medium as recited in claim 17, wherein the reward or advantage comprises virtual currency or virtual chips.

* * * * *